US006960152B2

(12) United States Patent
Aoki et al.

(10) Patent No.: US 6,960,152 B2
(45) Date of Patent: Nov. 1, 2005

(54) HYBRID VEHICLE DRIVE CONTROL DEVICE, HYBRID VEHICLE DRIVE CONTROL METHOD AND PROGRAM THEREOF

(75) Inventors: Kazuo Aoki, Anjo (JP); Toshio Okoshi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 62 days.

(21) Appl. No.: 10/475,770

(22) PCT Filed: Dec. 26, 2002

(86) PCT No.: PCT/JP02/13604

§ 371 (c)(1), (2), (4) Date: Jan. 23, 2004

(87) PCT Pub. No.: WO03/055711

PCT Pub. Date: Jul. 10, 2003

(65) Prior Publication Data

US 2004/0235613 A1 Nov. 25, 2004

(30) Foreign Application Priority Data

Dec. 26, 2001 (JP) ....................................... 2001-394956
Aug. 9, 2002 (JP) ....................................... 2002-234189

(51) Int. Cl.[7] .................................................. B60K 1/02
(52) U.S. Cl. ........................................................... 477/3
(58) Field of Search ........................... 180/65.2; 60/711, 60/716; 477/3

(56) References Cited

U.S. PATENT DOCUMENTS

| | | | | |
|---|---|---|---|---|
| 5,903,061 A | * | 5/1999 | Tsuzuki et al. | 290/40 C |
| 6,005,297 A | | 12/1999 | Sasaki et al. | |
| 6,679,346 B2 | * | 1/2004 | Raftari et al. | 180/65.3 |

FOREIGN PATENT DOCUMENTS

| | | |
|---|---|---|
| JP | 6-90507 | 3/1949 |
| JP | 62-217805 | 9/1987 |
| JP | 8-37702 | 2/1996 |
| JP | 9-98508 | 4/1997 |
| JP | A 10-325344 | 12/1998 |
| JP | 11-027806 | 1/1999 |
| JP | A 11-82258 | 3/1999 |

* cited by examiner

*Primary Examiner*—Dirk Wright
(74) *Attorney, Agent, or Firm*—Oliff & Berridge, PLC

(57) ABSTRACT

A hybrid control device including a drive motor that compensates for an excessive or a deficient amount of engine torque with respect to a vehicle requirement torque and a controller that detects a torque limit index, which is an index that limits a drive motor torque, determines whether the torque limit index has exceeded a threshold value, limits the drive motor torque when the torque limit index has exceeded the threshold value, and adjusts the engine torque in accordance with a limiting of the drive motor torque.

19 Claims, 22 Drawing Sheets

HYBRID VEHICLE DRIVE CONTROL DEVICE, HYBRID VEHICLE DRIVE CONTROL METHOD AND PROGRAM THEREOF

BACKGROUND OF THE INVENTION

1. Field of Invention

The invention relates to a hybrid vehicle drive control device, a hybrid vehicle drive control method and a program thereof.

2. Description of Related Art

Conventionally, there exists various types of hybrid vehicles. For example, in a first type of hybrid vehicle, an engine and a drive motor are directly connected, so that an engine torque and a drive motor torque can be transmitted to a drive wheel. Thus, when torque that is required to make a hybrid vehicle run (vehicle requirement torque) is small, the engine is driven at the most efficient operation point on an optimal fuel consumption curve. The drive motor torque that corresponds to the amount of the engine torque in excess of the vehicle requirement torque is also absorbed as regenerative torque, and electrical energy is generated by the drive motor, which is used for charging a battery. (See Japanese Patent Laid-Open Publication No. 11-82258).

Furthermore, a second type of hybrid vehicle has a planetary gear unit that is provided with a sun gear, a ring gear and a carrier. The carrier and the engine are connected, the ring gear and a drive wheel are connected, and the sun gear and a generator are connected, wherein a portion of the engine torque is transmitted to the generator, and the remaining amount is transmitted along with the drive motor torque to the drive wheel.

In this case, in an overdrive state that reduces the engine torque in the engine and increases a speed of revolution of the engine, (the engine speed) electrical energy is generated by absorbing as regenerative torque the drive motor torque that corresponds to a portion of the engine torque transmitted from the engine to the drive motor, and the generator is driven as an electric motor using this electrical energy. (See Japanese Patent Laid-Open Publication No. 10-325344). Further, in one known example of the second type of hybrid vehicle, the hybrid vehicle, when running an engine to generate power by a generator, is moved backward by causing a drive motor to generate drive motor torque in a reverse direction such that it is sufficient to overpower the engine output (refer to U.S. Pat. No. 6,005,297).

SUMMARY OF THE INVENTION

However, with the first type of conventional hybrid vehicle, for example, it becomes necessary to limit the regenerative torque when overheating occurs when the electrical energy is generated by the drive motor. However, the drive motor torque that corresponds to the amount of the engine torque in excess of the vehicle requirement torque cannot be absorbed by the regenerative torque. In this case, an engine torque greater than the vehicle requirement torque is transmitted to the drive wheel, thereby imparting an unpleasant sensation to a driver.

Furthermore, in the second type of hybrid vehicle, if an amount of engine torque is attempted to be absorbed as regenerative torque in a high vehicle speed zone, like the engine, the drive motor is made to rotate at a high rotational speed. The drive motor thus cannot adequately absorb the regenerative torque. As a result, it is necessary to limit the regenerative torque. However in this case, an engine torque greater than the vehicle requirement torque is transmitted to the drive wheel, and thus an unpleasant sensation is imparted to a driver.

Further, in the above-mentioned second type of hybrid vehicle, there is a case where, for example, the hybrid vehicle is driven backward while the engine is running and the generator is generating power. If it becomes necessary to limit drive motor torque for some reason, the drive motor torque in the reverse direction which is sufficient to overpower the engine torque cannot be generated. This makes it difficult to move the hybrid vehicle backward, and as a result, an uncomfortable sensation is imparted to a driver.

The invention thus solves the problems of the aforementioned conventional hybrid vehicles, and provides a hybrid vehicle drive control device that does not impart an unpleasant sensation to a driver when it becomes necessary to limit drive motor torque, a hybrid vehicle drive control method and a program thereof.

For this purpose, the hybrid vehicle control device according to an exemplary aspect of the invention includes a motor that compensates for an excessive or a deficient amount of engine torque with respect to a vehicle requirement torque and a controller that detects a torque limit index, which is an index that limits a drive motor torque, determines whether the torque limit index has exceeded a threshold value, limits the drive motor torque when the torque limit index has exceeded the threshold value, and adjusts the engine torque, in accordance with a limiting of the drive motor torque.

In this case, when the torque limit index has exceeded the threshold value and it has become necessary to limit the drive motor torque, the engine torque is adjusted and reduced by that amount. Therefore, the unpleasant sensation is not imparted to the driver because an engine torque greater than the vehicle requirement torque is not transmitted to the drive wheel.

According to an embodiment of the invention, the drive motor torque required to move the hybrid vehicle backward when the reverse range is selected is limited. As the drive motor torque is limited, the engine torque is adjusted.

According to another embodiment of the invention, it is possible to generate a drive motor torque in a reverse direction such that it is sufficient to overpower the engine output. This makes it easy to drive the hybrid vehicle backward, and a driver does not have an unpleasant sensation.

In a hybrid vehicle control method according to the invention, the method includes detecting a torque limit index, which is an index that limits a drive motor torque of a drive motor that compensates for an excessive or a deficient amount of engine torque with respect to a vehicle requirement torque vehicle, determining whether the torque limit index has exceeded a threshold value, limiting the drive motor torque when the torque limit index has exceeded the threshold value, and adjusting the engine torque in accordance with the limiting of the drive motor torque.

A program of the hybrid vehicle drive control apparatus includes a routine that determines whether a torque limit index has exceeded a threshold value, a routine that limits a drive motor torque when the torque limit index has exceeded the threshold value, and a routine that adjusts an engine torque in accordance with the limiting of the drive motor torque.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
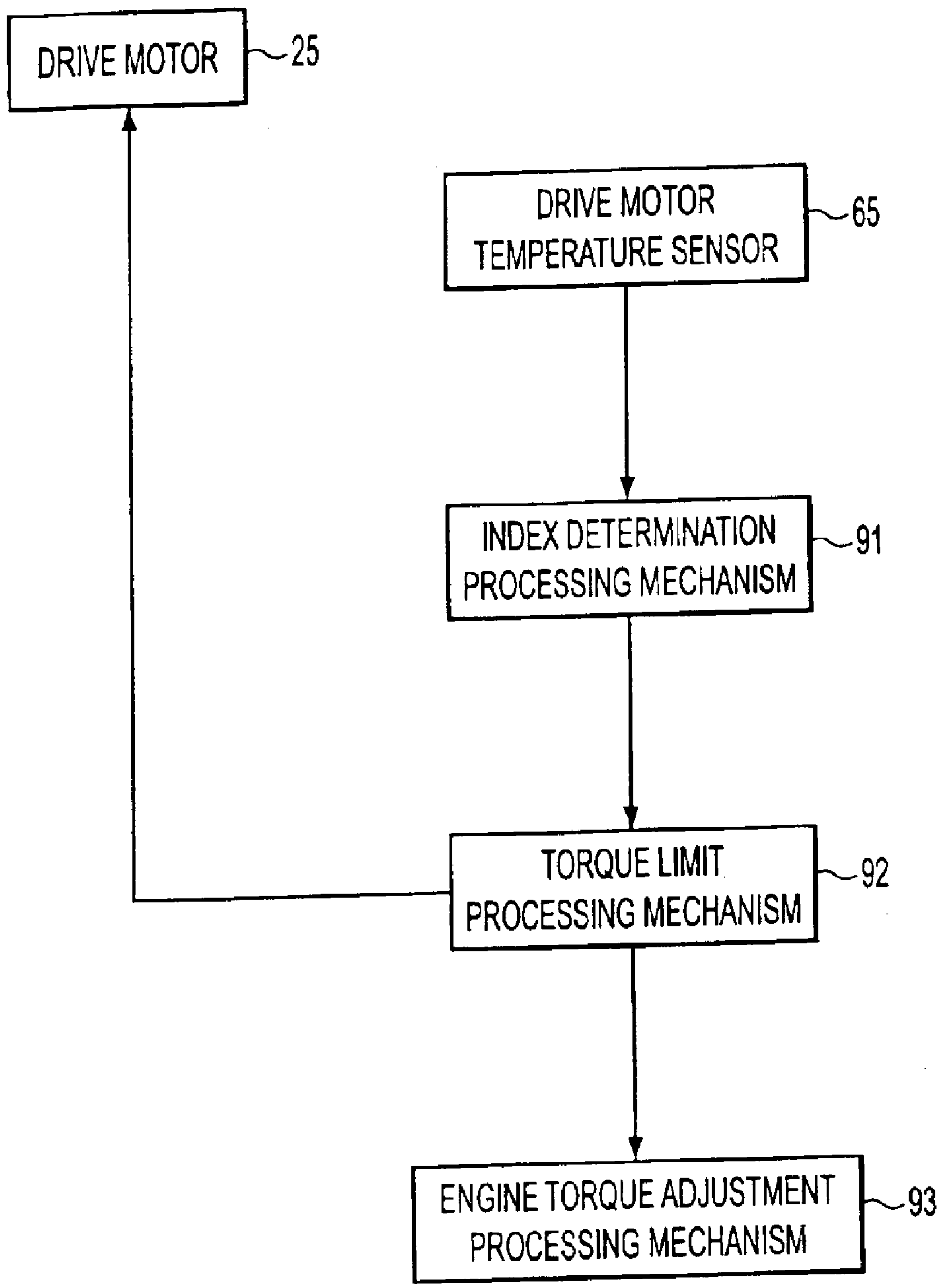
FIG. 1 is a function block diagram of a hybrid vehicle drive control device according to a first embodiment of the invention.

Hereafter, embodiments of the invention are described in detail with reference to the accompanying drawings. FIG. 1 is a function block diagram of a hybrid vehicle drive control device according to a first embodiment of the invention. In the drawing, reference numeral 25 denotes a drive motor that compensates for an excessive or a deficient amount of torque of an engine (not shown), i.e., the engine torque, with respect to a vehicle requirement torque required by a hybrid vehicle. Reference numeral 65 denotes a drive motor temperature sensor, which functions as a torque limit index detection portion that detects a torque limit index, which is an index that limits a torque of the drive motor 25, i.e., the drive motor torque. Reference numeral 91 denotes an index determination processing mechanism that determines whether the torque limit index has exceeded a threshold value; reference numeral 92 denotes a torque limit processing mechanism that limits the drive motor torque when the torque limit index has exceeded the threshold value; reference numeral 93 denotes an engine torque adjustment processing mechanism that adjusts the engine torque, in accordance with the limiting of the drive motor torque.

Figure 2:
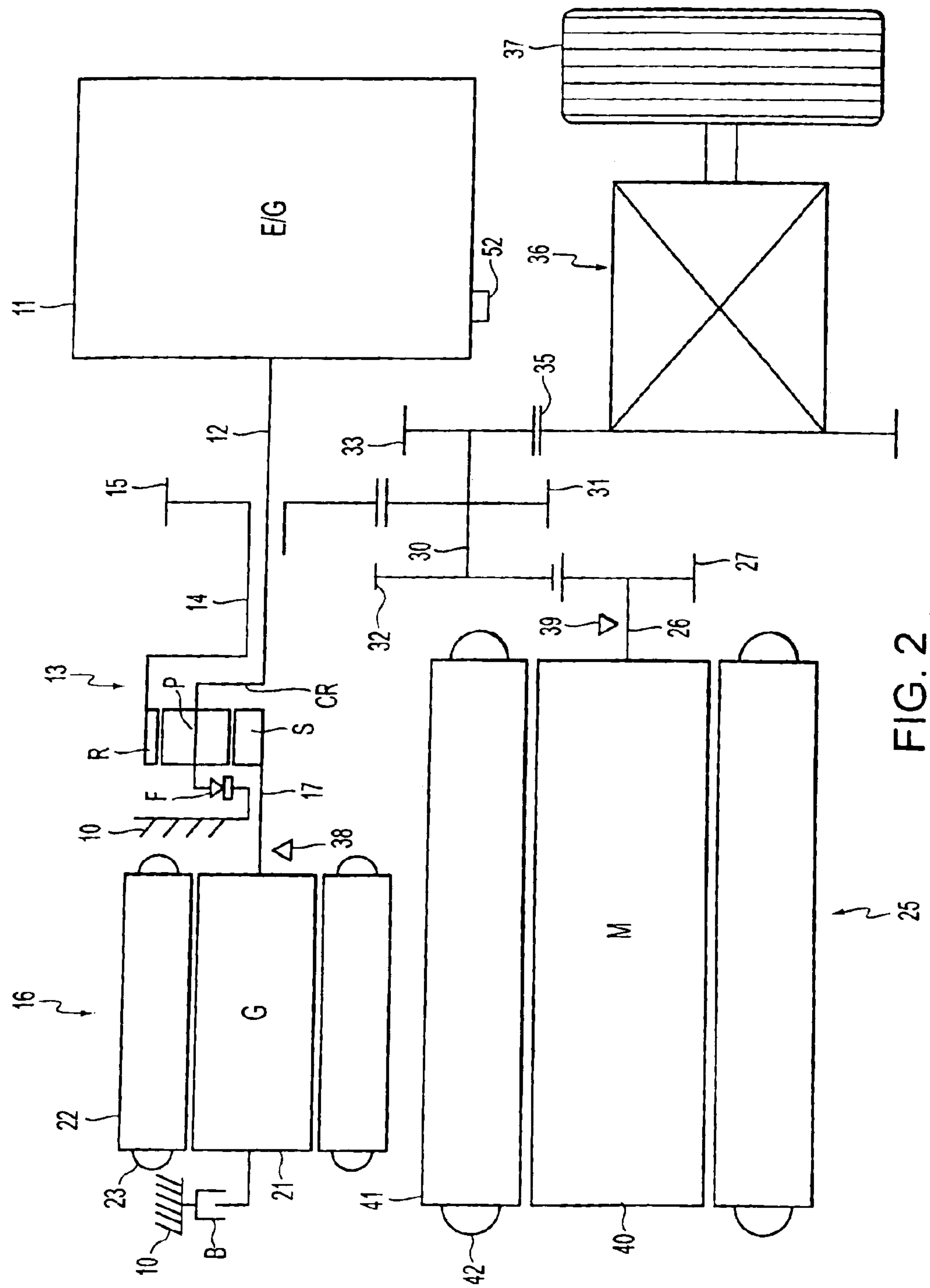
FIG. 2 is a conceptual diagram of a hybrid vehicle according to the first embodiment of the invention.

Next, the hybrid vehicle will be described. Note that in this case, the description refers to the second type of hybrid vehicle as described earlier, but the invention is also applicable to the first type of hybrid vehicle. FIG. 2 is a conceptual diagram of a hybrid vehicle according to the first embodiment of the invention.

In the drawing, reference numeral 11 denotes an engine (E/G) provided on a first axis; reference numeral 12 denotes an output shaft provided on the first axis that outputs rotation generated by the drive of the engine 11; reference numeral 13 denotes a planetary gear unit provided on the first axis which is a differential gear unit that shifts with regard to a rotation input via the output shaft 12; reference numeral 14 denotes an output shaft provided on the first axis that outputs the rotation after shifting the planetary gear unit 13; reference numeral 15 denotes a first counter drive gear which is an output gear fixed to the output shaft 14; reference numeral 16 denotes a generator (G), provided on the first axis, which is a first electric machine that is connected with the planetary gear unit 13 via a transfer shaft 17 and is further mechanically connected with the engine 11 in a manner allowing differential rotation.

The output shaft 14 has a sleeve shape and is provided encircling the output shaft 12. Also, the first counter drive gear 15 is provided closer to the engine 11 side than the planetary gear unit 13.

The planetary gear unit 13 is equipped with at least a sun gear S which is a first gear element, a pinion P that meshes with the sun gear S, a ring gear R which is a second gear element that meshes with the pinion P, and a carrier CR which is a third gear element that rotatably supports the pinion P. The sun gear S is connected with the generator 16 via the transfer shaft 17, the ring gear R is connected, via the output shaft 14 and a predetermined gear train, with a drive wheel 37 and the drive motor (M) 25 which is a second electric machine, and the carrier CR is connected with the engine 11 via the output shaft 12. Furthermore, the drive motor 25 is provided on a second axis parallel to the first axis, and is mechanically connected with the engine 11 and the generator 16 in a manner allowing differential rotation, and is mechanically connected with the drive wheel 37. Also, a one-way clutch F is provided between the carrier CR and a case 10 of a hybrid vehicle drive device, which is a vehicle drive device. The one-way clutch F becomes free when forward rotation from the engine 11 is transmitted to the carrier CR, and locked when reverse rotation from the generator 16 or the drive motor 25 is transmitted to the carrier CR, so that the reverse rotation is not transmitted to the engine 11.

The generator 16 is fixed to the transfer shaft 17 and includes a rotor 21 that is provided rotatably, a stator 22 that is provided around the rotor 21, and a coil 23 that is wound around the stator 22. The generator 16 generates electric power through the rotation transmitted via the transfer shaft 17. The coil 23 is connected to a battery (not shown), and alternating current from the coil 23 is converted to direct current and supplied to the battery. A generator brake B is provided between the rotor 21 and the case 10, and by engaging the generator brake B, the rotor 21 is fixed and the rotation of the generator 16 can be mechanically stopped.

In addition, reference numeral 26 denotes an output shaft provided on the second axis that outputs the rotation of the drive motor 25, and reference numeral 27 denotes a second counter drive gear which is an output gear that is fixed to the output shaft 26. The drive motor 25 includes a rotor 40 that is fixed to the output shaft 26 and provided rotatably, a stator 41 that is provided around the rotor 40, and a coil 42 that is wound around the stator 41.

The drive motor 25 generates a drive motor torque TM through the phase U, V, and W electric currents that are alternating currents supplied to the coil 42. Therefore, the coil 42 is connected to the battery, so that the direct current from the battery is converted into electric current of each phase and supplied to the coil 42.

In order to rotate the drive wheel 37 in the same direction of rotation as the engine 11, a counter shaft 30 is provided on a third axis parallel to the first and second axes. Furthermore, a first counter driven gear 31 and a second counter driven gear 32 that has more teeth than the first counter driven gear 31 are fixed to the counter shaft 30. The first counter driven gear 31 and the first counter drive gear 15, and the second counter driven gear 32 and the second counter drive gear 27 are meshed respectively, such that the rotation of the first counter drive gear 15 is reversed, so as to be transmitted to the first counter driven gear 31 and the rotation of the second counter drive gear 27 is reversed so as to be transmitted to the second counter driven gear 32. Furthermore, a differential pinion gear 33 that has fewer teeth than the first counter driven gear 31 is fixed to the counter shaft 30.

A differential device 36 is provided on a fourth axis parallel to the first, second, and third axes, and a differential ring gear 35 of the differential device 36 is meshed with the differential pinion gear 33. Accordingly, rotation transmitted to the differential ring gear 35 is distributed and transmitted to the drive wheel 37 by the differential device 36. Thus, not only can rotation generated by the engine 11 be transmitted to the first counter driven gear 31, but rotation generated by the drive motor 25 can also be transmitted to the second counter driven gear 32. Therefore the hybrid vehicle is capable of running on the drive of both the engine 11 and the drive motor 25.

In this case, reference numeral 3 8 denotes a generator rotor position sensor such as a resolver that detects the position of the rotor 21, i.e., a generator rotor position θG, and reference numeral 39 denotes a drive motor rotor position sensor such as a resolver that detects the position of the rotor 40, i.e., a drive motor rotor position θM. The detected generator rotor position θG is sent to a vehicle control device (not shown) and a generator control device (not shown). The drive motor rotor position θM is sent to the vehicle control device and a drive motor control device (not shown). Furthermore, reference numeral 52 denotes an engine rotational speed sensor which is an engine rotational speed detection mechanism that detects a rotational speed of the engine 11, i.e., an engine rotational speed NE.

Figure 3:
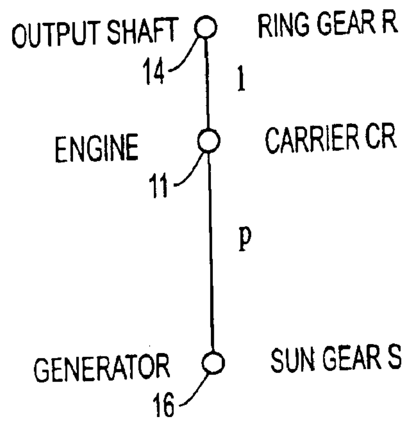
FIG. 3 is an operation explanatory diagram of a planetary gear unit according to the first embodiment of the invention.
Figure 4:
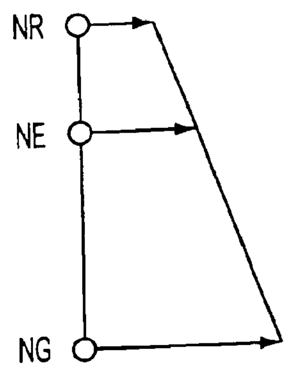
FIG. 4 is a diagram of vehicle speed during normal running periods according to the first embodiment of the invention.
Figure 5:
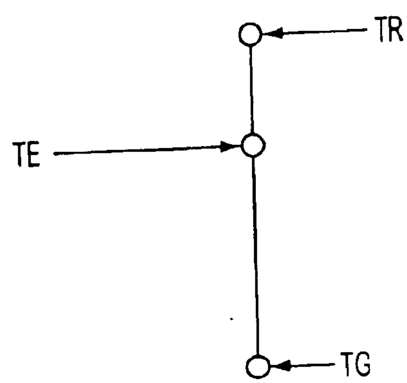
FIG. 5 is a diagram of torque during normal running periods according to the first embodiment of the invention.

Next, the operation of the planetary gear unit 13 will be described. FIG. 3 is an operation explanatory diagram of a planetary gear unit according to the first embodiment of the invention, and FIG. 4 is a diagram of vehicle speed during normal running periods according to the first embodiment of the invention. FIG. 5 is a diagram of torque during normal running periods according to the first embodiment of the invention.

In the planetary gear unit 13 (FIG. 2), the carrier CR is connected with the engine 11, the sun gear S is connected with the generator 16, and the ring gear R is connected with the drive motor 25 and the drive wheel 37 respectively via the output shaft 14. Therefore, a rotational speed of the ring gear R, i.e., a ring gear rotational speed NR, and a rotational speed output to the output shaft 14, i.e., an output shaft rotational speed are equal, and a rotational speed of the carrier CR and the engine rotational speed NE are equal. Furthermore, a rotational speed of the sun gear S and a rotational speed of the generator 16, i.e., a generator rotational speed NG become equal. When the number of teeth of the ring gear R is ρ times the number of teeth of the sun gear S (two times in the embodiment), the relationship, $$(\rho+1)\cdot NE=1\cdot NG+\rho\cdot NR$$

is established. Accordingly, based on the ring gear rotational speed NR and the generator rotational speed NG, the engine rotational speed NE, $$NE=(1\cdot NG+\rho\cdot NR)/(\rho+1) \tag{1}$$

can be calculated. In this case, the rotational speed relational expression of the planetary gear unit 13 is constructed according to formula (1).

In addition, an engine torque TE, a torque generated by the ring gear R, i.e., a ring gear torque TR, and a torque of the generator 16, i.e., a generator torque TG, have the relationship, $$TE:TR:TG=(\rho+1):\rho:\ 1 \tag{2}$$

and receive reaction forces from each other. In this case, the torque relational expression of the planetary gear unit 13 is constructed according to formula (2).

During a normal running period of the hybrid vehicle, each of the ring gear R, the carrier CR, and the sun gear S are rotated in the positive direction, and as shown in FIG. 4, each of the ring gear rotational speed NR, the engine rotational speed NE, and the generator rotational speed NG assumes a positive value. In addition, the ring gear torque TR and the generator torque TG are obtained by proportionally dividing the engine torque TE by the torque ratio determined by the number of teeth in the planetary gear unit 13. Therefore, in the torque diagram shown in FIG. 5, the sum of the ring gear torque TR and the generator torque TG becomes the engine torque TE.

Figure 6:
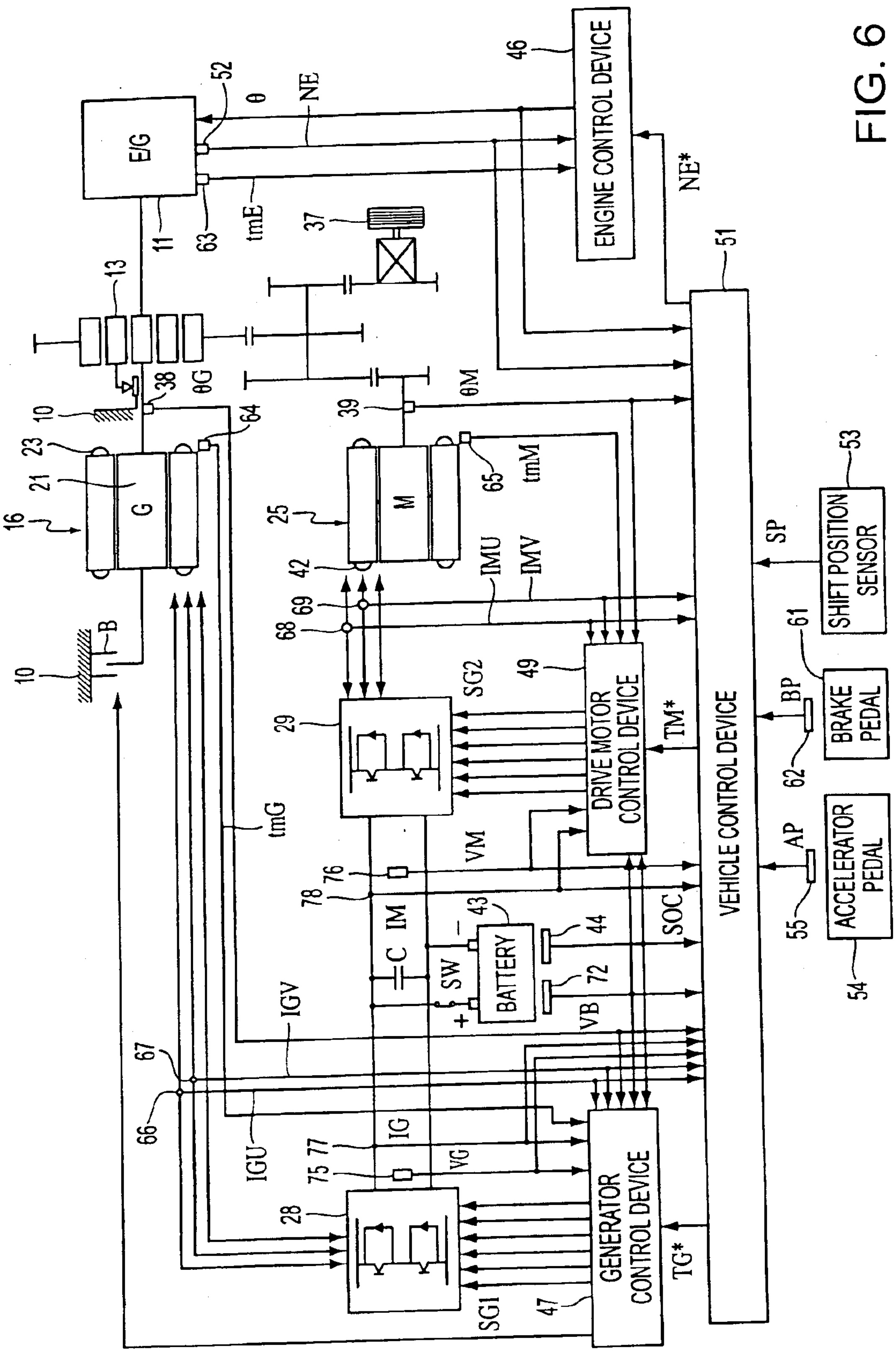
FIG. 6 is a conceptual diagram of a hybrid vehicle drive control device according to the first embodiment of the invention.

Next, the hybrid vehicle drive control device, which is an electric vehicle drive control device, that controls the hybrid vehicle drive device will be described. FIG. 6 is a conceptual diagram of a hybrid vehicle drive control device according to the first embodiment of the invention.

In the drawing, reference numeral 10 denotes the case; reference numeral 11 denotes the engine (E/G); reference numeral 13 denotes the planetary gear unit; reference numeral 16 denotes the generator (G); reference symbol B denotes the generator brake for fixing the rotor 21 of the generator 16; reference numeral 25 denotes the drive motor (M); reference numeral 28 denotes an inverter which is a generator inverter for driving the generator 16; reference numeral 29 denotes an inverter which is a drive motor inverter for driving the drive motor 25; reference numeral 37 denotes the drive wheel; reference numeral 38 denotes the generator rotor position sensor; reference numeral 39 denotes the drive motor rotor position sensor; and reference numeral 43 denotes the battery. The inverters 28 and 29 are connected to the battery 43 via a power switch SW, and when the power switch SW is on, the battery 43 supplies a direct current to the inverters 28 and 29.

On the input port side of the inverter 28, a generator inverter voltage sensor 75 which is a first direct current voltage detection portion for detecting a direct current voltage applied to the inverter 28, i.e., a generator inverter voltage VG, and a generator inverter electric current sensor 77 which is a first direct current detection portion for detecting a direct current supplied to the inverter 28, i.e., a generator inverter electric current IG, are provided. In addition, the input port side of the inverter 29 is provided with a drive motor inverter voltage sensor 76 which is a second direct current voltage detection portion for detecting a direct current voltage applied to the inverter 29, i.e., a drive motor inverter voltage VM, and a drive motor inverter electric current sensor 78 which is a second direct current detection portion for detecting a direct current supplied to the inverter 29, i.e., a drive motor inverter electric current IM. The generator inverter voltage VG and the generator inverter electric current IG are sent to a vehicle control device 51 and a generator control device 47, while the drive motor inverter voltage VM and the drive motor inverter electric current IM are sent to the vehicle control device 51 and a drive motor control device 49. A smoothing capacitor C is connected between the battery 43 and the inverters 28 and 29.

Also, the vehicle control device 51 includes a CPU, recording equipment, and the like (not shown), controls the entire hybrid vehicle drive control device, and functions as a computer based on various programs, data, and the like. An engine control device 46, the generator control device 47, and the drive motor control device 49 are connected to the vehicle control device 51. The engine control device 46 includes a CPU, recording equipment, and the like (not shown), and sends command signals such as throttle opening θ and valve timing to the engine 11 in order to control the engine 11. The generator control device 47 includes a CPU, recording equipment, and the like (not shown), and sends a drive signal SG1 to the inverter 28 in order to control the generator 16. Furthermore, the drive motor control device 49 includes a CPU, recording equipment, and the like (not shown), and sends a drive signal SG2 to the inverter 29 in order to control the drive motor 25. In this case, the engine control device 46, the generator control device 47, and the drive motor control device 49 constitute a first control device that is subordinate to the vehicle control device 51, and the vehicle control device 51 constitutes a second control device that is superordinate to the engine control device 46, the generator control device 47, and the drive motor control device 49. In addition, the engine control device 46, the generator control device 47, and the drive motor control device 49 also function as computers based on various programs, data, and the like.

The inverter 28 is driven according to the drive signal SG1, and receives a direct current from the battery 43 during powering, thereby generating the electric current IGU, IGV, and IGW of each phase, and supplying the electric current IGU, IGV, and IGW of each phase to the generator 16. During regeneration, the inverter 28 receives the electric current IGU, IGV, and IGW of each phase from the generator 16, and generates a direct current which is supplied to the battery 43.

Furthermore, the inverter 29 is driven according to the drive signal SG2, and receives a direct current from the battery 43 during powering, thereby generating electric current IMU, IMV, and IMW of each phase, and supplying the electric current IMU, IMV, and IMW of each phase to the drive motor 25. During regeneration, the inverter 29 receives the electric current IMU, IMV, and IMW of each phase from the drive motor 25, and generates a direct current which is supplied to the battery 43.

Furthermore, reference numeral 44 denotes a battery remaining charge detection device that detects a state of the battery 43, i.e., a battery remaining charge SOC which is a battery state; reference numeral 52 denotes the engine rotational speed sensor, reference numeral 53 denotes a shift position sensor that detects the position of a shift lever (not shown) which is a speed selecting operation mechanism, i.e., a shift position SP; reference numeral 54 denotes an accelerator pedal; reference numeral 55 denotes an accelerator switch which is an accelerator operation detection portion that detects a position (amount of depression) of the accelerator pedal 54, i.e., an accelerator pedal position AP; reference numeral 61 denotes a brake pedal; reference numeral 62 denotes a brake switch which is a brake operation detection portion that detects a position (amount of depression) of the brake pedal 61, i.e., a brake pedal position BP; reference numeral 63 denotes an engine temperature sensor that detects a temperature tmE of the engine 11; reference numeral 64 denotes a generator temperature sensor that detects a temperature of the generator 16, for example, a temperature tmG of the coil 23; reference numeral 65 denotes the drive motor temperature sensor which is a torque limit index detection portion and a temperature detection portion that detects a temperature of the drive motor 25, for example, a temperature tmM of the coil 42.

Furthermore, reference numerals 66 to 69 denote electric current sensors which are alternating electric current detection portions that detect electric currents, IGU, IGV, IMU, and IMV of each phase, and reference numeral 72 denotes a battery voltage sensor which is a voltage detection portion for the battery 43 that detects a battery voltage VB which is a battery state. The battery voltage VB is sent to the generator control device 47, the drive motor control device 49, and the vehicle control device 51. In addition, battery electric current, battery temperature, and the like may be detected as battery states. The battery remaining charge detection device 44, the battery voltage sensor 72, a battery electric current sensor (not shown), a battery temperature sensor (not shown), and the like constitute a battery state detection portion. Also, the electric currents IGU and IGV are supplied to the generator control device 47 and the vehicle control device 51, while the electric currents IMU and MV are supplied to the drive motor control device 49 and the vehicle control device 51.

The vehicle control device 51 sends an engine control signal to the engine control device 46 so as to cause the engine control device 46 to set the starting and stopping of the engine 11. Furthermore, a vehicle speed calculation processing mechanism (not shown) of the vehicle control device 51 executes a vehicle speed calculation process to calculate a changing rate $\Delta\theta M$ of the drive motor rotor position $\theta M$, and calculates the vehicle speed V based on the changing rate $\Delta\theta M$ and a gear ratio $\gamma V$ of the torque transmission system from the output shaft 26 to the drive wheel 37.

Then, the vehicle control device 51 sets an engine target rotational speed NE* that indicates a target value for the engine rotational speed NE, a generator target torque TG* that indicates a target value of the generator torque TG, and a drive motor target torque TM* that indicates a target value of the drive motor torque TM. The generator control device 47 sets a generator target rotational speed NG* that indicates a target value for the generator rotational speed NG, and the drive motor control device 49 sets a drive motor torque compensation value $\delta TM$ that indicates a compensation value of the drive motor torque TM. In this case, a control command value is constituted by the engine target rotational speed NE*, the generator target torque TG*, the drive motor target torque TM*, and the like.

In addition, a generator rotational speed calculation processing mechanism (not shown) of the generator control device 47 executes a generator rotational speed calculation process to calculate the generator rotational speed NG, by reading the generator rotor position $\theta G$ and calculating a changing rate $\Delta\theta G$ of the generator rotor position $\theta G$.

Furthermore, a drive motor rotational speed calculation processing mechanism (not shown) of the drive motor control device 49 executes a drive motor rotational speed calculation process to calculate the rotational speed of the drive motor 25, i.e., the drive motor rotational speed NM, by reading the drive motor rotor position $\theta M$ and calculating a changing rate $\Delta\theta M$ of the drive motor rotor position $\theta M$.

Since the generator rotor position $\theta G$ and the generator rotational speed NG are proportionate to each other, and the drive motor rotor position $\theta M$, the drive motor rotational speed NM, and the vehicle speed V are all proportionate to each other, the generator rotor position sensor 38 and the generator rotational speed calculation processing mechanism can function as a generator rotational speed detection portion that detects the generator rotational speed NG. Also, the drive motor rotor position sensor 39 and the drive motor rotational speed calculation processing mechanism can function as a drive motor rotational speed detection portion that detects the drive motor rotational speed NM. Furthermore, the drive motor rotor position sensor 39 and the vehicle speed calculation processing mechanism can function as a vehicle speed detection portion that detects the vehicle speed V.

In the embodiment, the engine rotational speed NE is detected by the engine rotational speed sensor 52, however, the engine rotational speed NE can also be calculated in the engine control device 46. Also, in the embodiment, the vehicle speed V is calculated by the vehicle speed calculation processing mechanism based on the drive motor rotor position $\theta M$. However, the vehicle speed V can also be calculated based on the detected ring gear rotational speed NR, or based on a rotational speed of the drive wheel 37, i.e., a drive wheel rotational speed. In this case, a ring gear rotational speed sensor, a drive wheel rotational speed sensor or the like are provided as a vehicle speed detection portion.

Figure 7:
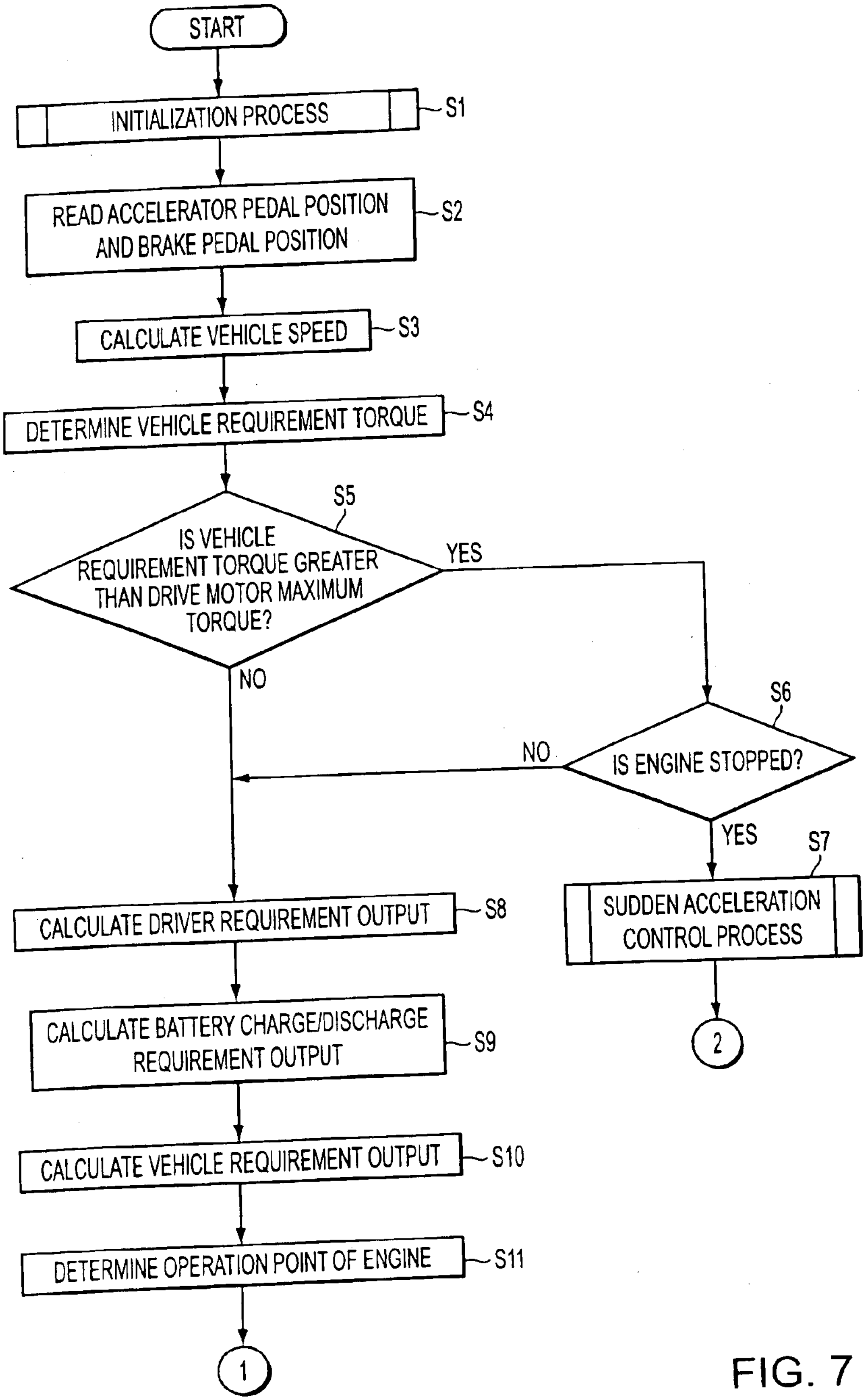
FIG. 7 is a first main flow chart illustrating an operation of a hybrid vehicle drive control device according to the first embodiment of the invention.
Figure 8:
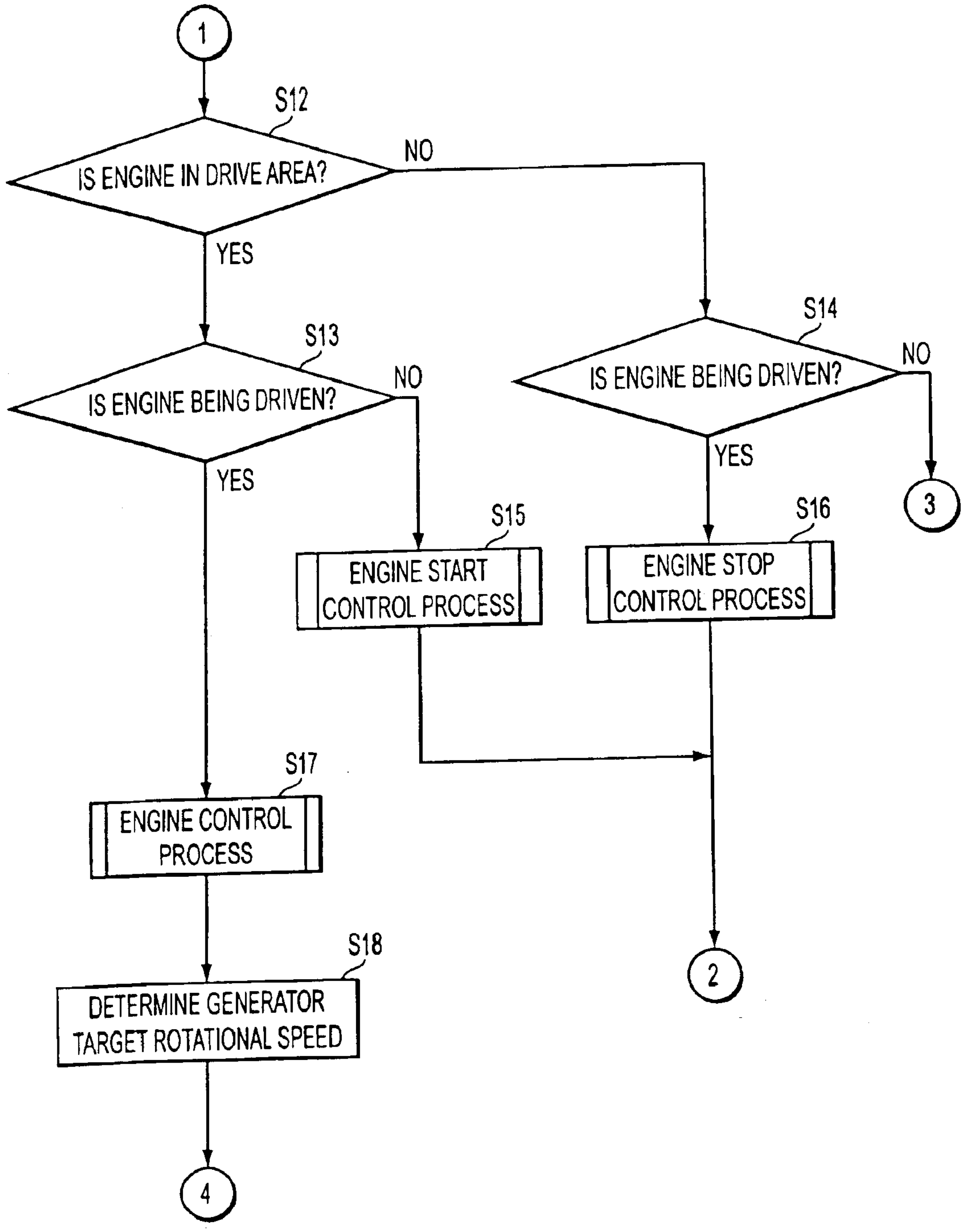
FIG. 8 is a second main flow chart illustrating the operation of the hybrid vehicle drive control device according to the first embodiment of the invention.
Figure 9:
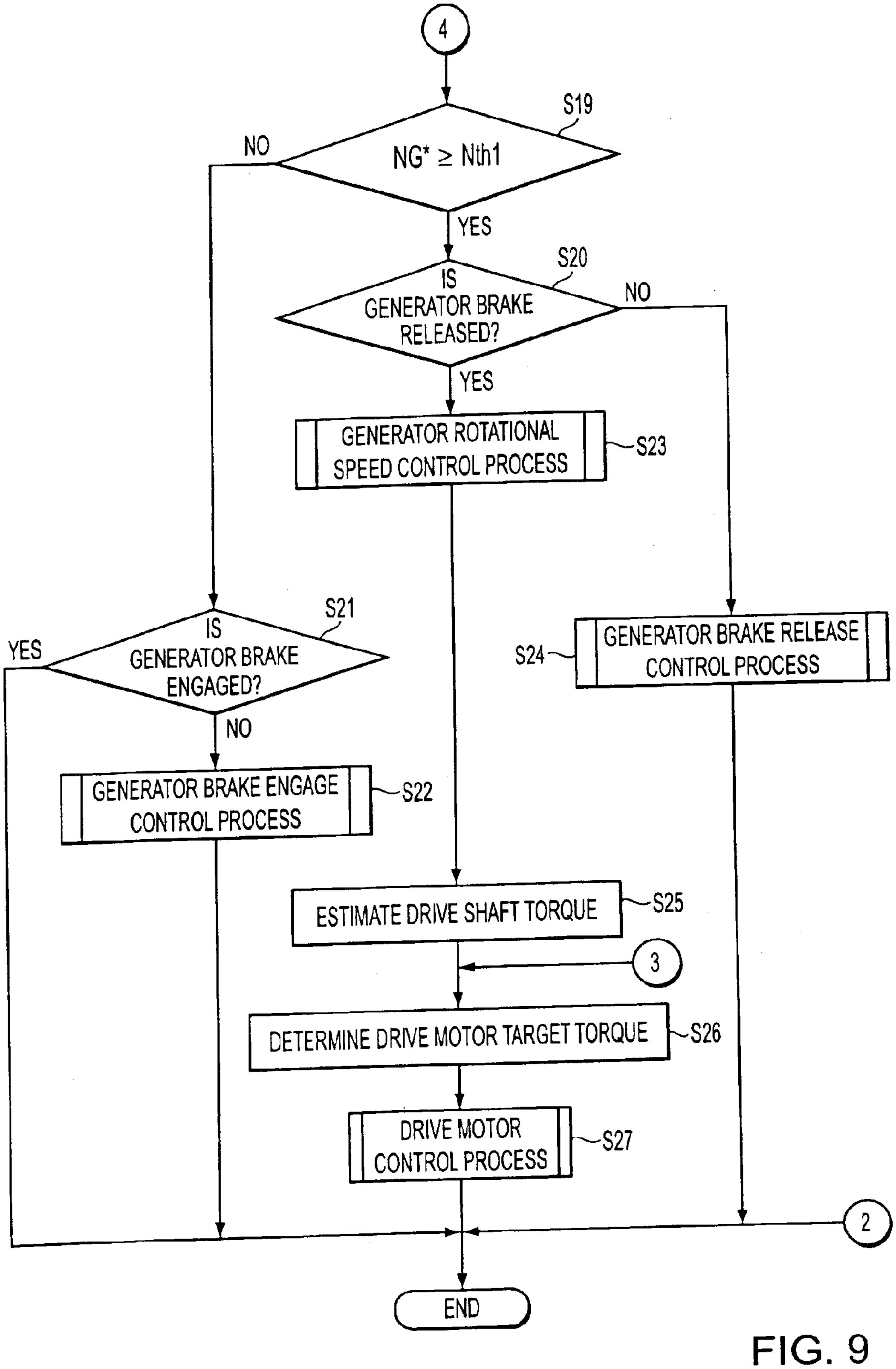
FIG. 9 is a third main flow chart illustrating the operation of the hybrid vehicle drive control device according to the first embodiment of the invention.
Figure 10:
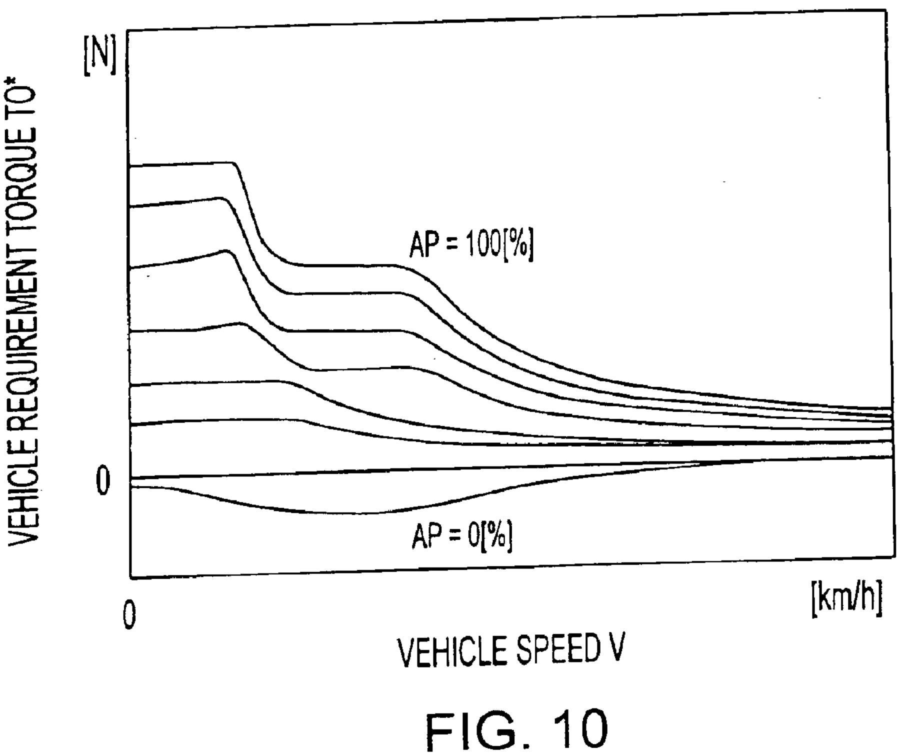
FIG. 10 is a drawing illustrating a first vehicle requirement torque map according to the first embodiment of the invention.
Figure 11:
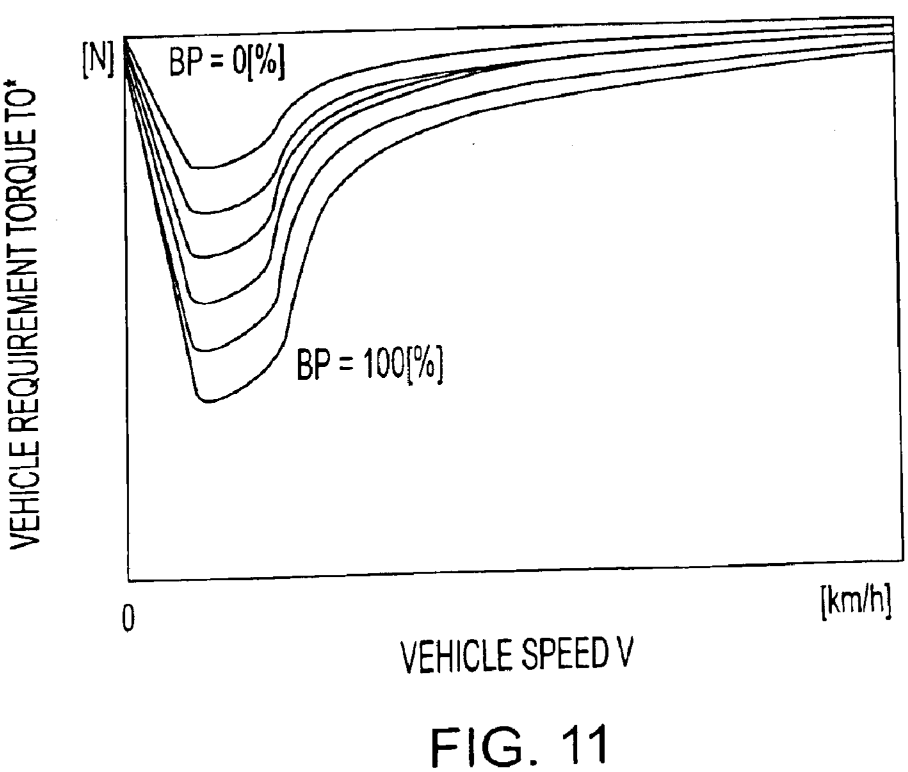
FIG. 11 is a drawing illustrating a second vehicle requirement torque map according to the first embodiment of the invention.
Figure 12:
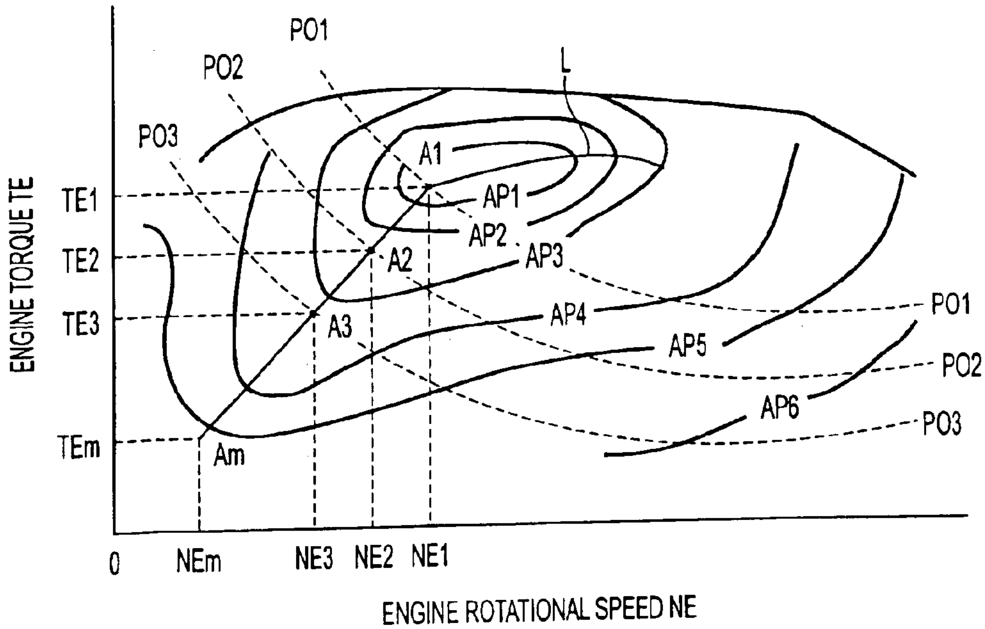
FIG. 12 is a drawing illustrating an engine target operation state map according to the first embodiment of the invention.
Figure 13:
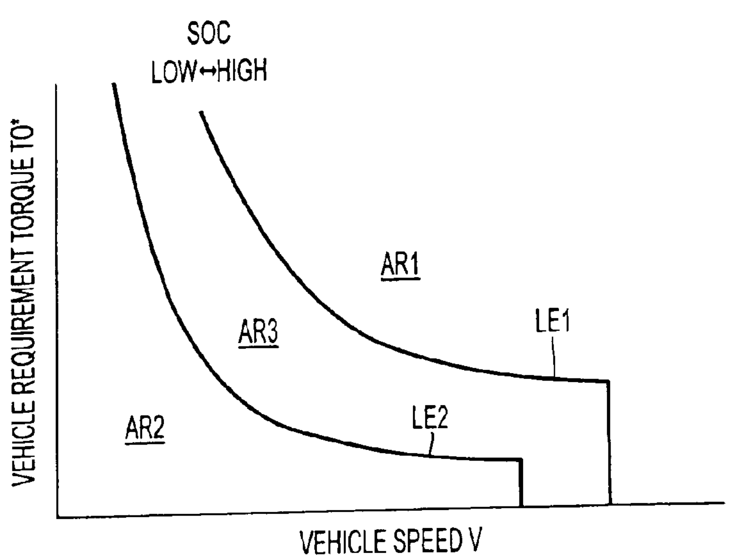
FIG. 13 is a drawing illustrating an engine drive area map according to the first embodiment of the invention.

Next, an operation of a hybrid vehicle drive control device of the aforementioned structure will be described. FIG. 7 is a first main flow chart illustrating the operation of the hybrid vehicle drive control device according to the first embodiment of the invention; FIG. 8 is a second main flow chart illustrating the operation of the hybrid vehicle drive control device according to the first embodiment of the invention; FIG. 9 is a third main flow chart illustrating the operation of the hybrid vehicle drive control device according to the first embodiment of the invention; FIG. 10 is a drawing illustrating a first vehicle requirement torque map according to the first embodiment of the invention; FIG. 11 is a drawing illustrating a second vehicle requirement torque map according to the first embodiment of the invention; FIG. 12 is a drawing illustrating an engine target operation state map according to the first embodiment of the invention; and FIG. 13 is a drawing illustrating an engine drive area map according to the first embodiment of the invention. In FIGS. 10, 11, and 13, the x-axis is the vehicle speed V and the y-axis is a vehicle requirement torque TO*. In FIG. 12, the x-axis is the engine rotational speed NE, and the y-axis is the engine torque TE.

First, an initialization processing mechanism (not shown) of the vehicle control device 51 (FIG. 6) executes an initialization process to set each type of variable to a default value. Next, the vehicle control device 51 reads the accelerator pedal position AP from the accelerator sensor 55 and the brake pedal position BP from the brake switch 62. Then, the vehicle speed calculation processing mechanism reads the drive motor rotor position $\theta M$, calculates the changing rate $\Delta\theta M$ of the drive motor rotor position $\theta M$, and then calculates the vehicle speed V based on the changing rate $\Delta\theta M$ and the gear ratio $\gamma V$.

Subsequently, a vehicle requirement torque determination processing mechanism (not shown) of the vehicle control device 51 executes the vehicle requirement torque determination process. When the accelerator pedal 54 is pressed, the vehicle control device 51 refers to the first vehicle requirement torque map in FIG. 10 which is recorded in the recording equipment of the vehicle control device 51. When the brake pedal 61 is pressed, the vehicle control device 51 refers to the second vehicle requirement torque map in FIG. 11 which is recorded in the recording equipment. The vehicle control device 51 thus determines the necessary vehicle requirement torque TO* for running the hybrid vehicle which is preset to correspond with the accelerator pedal position AP, the brake pedal position BP, and the vehicle speed V.

Next, the vehicle control device 51 determines whether the vehicle requirement torque TO* is greater than a drive motor maximum torque TMmax that is preset as the rating of the drive motor 25. If the vehicle requirement torque TO* is greater than the drive motor maximum torque TMmax, then the vehicle control device 51 determines whether the engine 11 is stopped. If the engine 11 is stopped, then a sudden acceleration control processing mechanism (not shown) of the vehicle control device 51 executes a sudden acceleration control process, thereby driving the drive motor 25 and the generator 16 to run the hybrid vehicle.

Also, when the vehicle requirement torque TO* is equal to or less than the drive motor maximum torque TMmax, or the vehicle requirement torque TO* is greater than the drive motor maximum torque TMmax and the engine 11 is being driven, a driver requirement output calculation processing mechanism (not shown) of the vehicle control device 51 executes a driver requirement output calculation process to calculate a driver requirement output PD by multiplying the vehicle requirement torque TO* by the vehicle speed V:

$$PD=TO^{*}\cdot V$$

Next, a battery charge/discharge requirement output calculation processing mechanism (not shown) of the vehicle control device 51 executes a battery charge/discharge requirement output calculation process to calculate a battery charge/discharge requirement output PB based on the battery remaining charge SOC by reading the battery remaining charge SOC from the battery remaining charge detection device 44.

Thereafter, a vehicle requirement output calculation processing mechanism (not shown) of the vehicle control device 51 executes a vehicle requirement output calculation process, and by adding the driver requirement output PD and the battery charge/discharge requirement output PB, calculates a vehicle requirement output PO:

$$PO=PD+PB$$

Next, an engine target operation state setting processing mechanism (not shown) of the vehicle control device 51 executes an engine target operation state setting process, and refers to the engine target operation state map in FIG. 12 which is recorded in the recording equipment of the vehicle control device 51 to determine as operation points of the engine 11 which are engine target operation states, the points Al to A3, and Am, at which the lines PO1, PO2, and the like which indicate whether the vehicle requirement output PO intersects the optimum fuel consumption curve L where the engine 11 reaches maximum efficiency at each accelerator pedal position AP1 to AP6. Then, engine torque TE1 to TE3, and TEm at the operation point are determined as the engine target torque TE* which indicates the target value of the engine torque TE, and engine rotational speeds NE1 to NE3, and NEm at the operation point are determined as the engine target rotational speed NE*. Thereafter, the engine target rotational speed NE* is sent to the engine control device 46.

Then, the engine control device 46 refers to the engine drive area map in FIG. 13 which is recorded in the recording equipment of the engine control device 46 and determines whether the engine 11 is in a drive area AR1. In FIG. 13, AR1 is a drive area where the engine 11 is driven, AR2 is a stop area where the drive of the engine 11 is stopped, and AR3 is a hysteresis area. Furthermore, LE1 is a line where the stopped engine 11 is driven, and LE2 is a line where the drive of the driving engine 11 is stopped. As the battery remaining charge SOC becomes higher, the line LE1 is shifted to the right in FIG. 13, and the drive area AR1 becomes more narrow. On the other hand, as the battery remaining charge SOC becomes lower, the line LE1 is shifted to the left in FIG. 13, and the drive area AR1 becomes wider.

If the engine 11 is not being driven despite the engine 11 being in the drive area AR1, an engine start control processing mechanism (not shown) of the engine control device 46 executes an engine start control process and causes the engine 11 to start. On the other hand, if the engine 11 is being driven despite the engine 11 not being in the drive area AR1, an engine stop control processing mechanism (not shown) of the engine control device 46 executes an engine stop control process and stops the drive of the engine 11. Furthermore, if the engine 11 is not being driven with the engine 11 not in the drive area AR1, a drive motor target torque calculation processing mechanism (not shown) of the vehicle control device 51 executes a drive motor target torque calculation process to calculate and determine the vehicle requirement torque TO* as the drive motor target torque TM*, and sends the drive motor target torque TM* to the drive motor control device 49. The drive motor control processing mechanism (not shown) of the drive motor control device 49 executes a drive motor control process and controls the torque of the drive motor 25.

In addition, when the engine 11 is in the drive area AR1 and the engine 11 is being driven, an engine control processing mechanism (not shown) of the engine control device 46 executes an engine control process and controls the engine 11 by a predetermined method.

Next, a generator target rotational speed calculation processing mechanism (not shown) of the generator control device 47 executes a generator target rotational speed calculation process. Specifically, the drive motor rotor position θM is read from the drive motor rotor position sensor 39, and the ring gear rotational speed NR is calculated based on the drive motor rotor position θM and a gear ratio γR from the output shaft 26 (FIG. 2) to the ring gear R. Also, the engine target rotational speed NE* set through the engine target operation state setting process is read, and the generator target rotational speed NG* is calculated and determined, using the rotational speed relational expression, based on the ring gear rotational speed NR and the engine target rotational speed NE*.

Meanwhile, when the generator rotational speed NG is low while the engine 11 and the motor 25 are driven to run the hybrid vehicle, power consumption increases, thereby reducing the power generation efficiency of the generator 16 and causing the fuel efficiency of the hybrid vehicle to become that much worse. Therefore, when the absolute value of the generator target rotational speed NG* is smaller than a predetermined rotational speed, the generator brake B is engaged, thereby mechanically stopping the generator 16 so as to improve fuel efficiency.

For that purpose, the generator control device 47 determines whether the absolute value of the generator target rotational speed NG* is equal to or higher than a predetermined first rotational speed Nth1 (for example, 500 [rpm]). If the absolute value of the generator target rotational speed NG* is equal to or higher than the first rotational speed Nth1, the generator control device 47 determines whether the generator brake B is released. Then, if the generator brake B is released, a generator rotational speed control processing mechanism (not shown) of the generator control device 47 executes a generator rotational speed control process and controls the torque of the generator 16. On the other hand, if the generator brake B has not been released, a generator brake release control processing mechanism (not shown) of the generator control device 47 executes a generator brake release control process and releases the generator brake B.

Meanwhile, in the generator rotational speed control process, when a predetermined generator torque TG is generated after the generator target torque TG* is determined and the torque of the generator 16 is controlled based on the generator target torque TG*, as described earlier, the engine torque TE, the ring gear torque TR, and the generator torque TG will receive reaction forces from each other, therefore, the generator torque TG is converted into the ring gear torque TR to be output from the ring gear R.

Then, if fluctuations in the generator rotational speed NG occurs along with the ring gear torque TR output from the ring gear R, and the ring gear torque TR fluctuates, the fluctuating ring gear torque TR is transmitted to the drive wheel 37 which deteriorates the running feeling of the hybrid vehicle. Therefore, the ring gear torque TR is calculated taking into account the torque corresponding to the inertia of the generator 16 (inertia of the rotor 21 and a rotor shaft) involved in the fluctuations of the generator rotational speed NG.

For that purpose, a ring gear torque calculation processing mechanism (not shown) of the vehicle control device 51 executes a ring gear torque calculation process, reads the generator target torque TG*, and calculates the ring gear torque TR based on the generator target torque TG* and the ratio of the number of ring gear R teeth to the number of sun gear S teeth.

Namely, when InG is the inertia of the generator 16 and $\alpha G$ is the angular acceleration (rotation changing rate) of the generator 16, torque applied to the sun gear S, i.e., a sun gear torque TS is obtained by adding a torque equivalent component (inertia torque) TGI corresponding to the inertia InG to the generator target torque TG*, $$TGI = InG \cdot \alpha G$$

thereby becoming:

$$TS = TG^* + TGI = TG^* + InG \cdot \alpha G \tag{3}$$

The torque equivalent component TGI usually assumes a negative value in the direction of acceleration while the hybrid vehicle is accelerating and assumes a positive value in the direction of acceleration when the hybrid vehicle is decelerating. Also, the angular acceleration $\alpha G$ is calculated by differentiating the generator rotational speed NG.

When the number of ring gear R teeth is $\rho$ times greater than the number of sun gear S teeth, the ring gear torque TR is $\rho$ times the sun gear torque TS, therefore TR becomes:

$$\begin{aligned} TR &= \rho \cdot TS \\ &= \rho \cdot (TG^* + TGI) \\ &= \rho \cdot (TG^* + InG \cdot \alpha G) \end{aligned} \tag{4}$$

As shown above, the ring gear torque TR can be calculated from the generator target torque TG* and the torque equivalent component TGI.

Therefore, a drive shaft torque estimation processing mechanism (not shown) of the drive motor control device 49 executes a drive shaft torque estimation process, and estimates a torque of the output shaft 26, i.e., a drive shaft torque TR/OUT, based on the generator target torque TG* and the torque equivalent component TGI. Namely, the drive shaft torque estimation processing mechanism estimates and calculates the drive shaft torque TR/OUT based on the ring gear torque TR and the ratio of the number of second counter drive gear 27 teeth to the number of ring gear R teeth.

Meanwhile, at the time the generator brake B is engaged, the generator target torque TG* becomes zero (0), therefore the ring gear torque TR takes on a proportional relationship with the engine torque TE. So when the generator brake B is engaged, the drive shaft torque estimation processing mechanism reads the engine torque TE from the engine control device 46, calculates the ring gear torque TR based on the engine torque TE using the aforementioned torque relational expression, and estimates the drive shaft torque TR/OUT based on the ring gear torque TR and the ratio of the number of second counter drive gear 27 teeth to the number of ring gear R teeth.

Subsequently, the drive motor target torque calculation processing mechanism executes a drive motor target torque calculation process, and by subtracting the drive shaft torque TR/OUT from the vehicle requirement torque TO*, calculates and determines the excessive or deficient amount of torque in the drive shaft torque TR/OUT as the drive motor target torque TM*.

Then, the drive motor control processing mechanism executes a drive motor control process, and controls the torque of the drive motor 25 based on the determined drive motor target torque TM* to control the drive motor torque TM.

In addition, when the absolute value of the generator target rotational speed NG* is smaller than the first rotational speed Nth1, the generator control device 47 determines whether the generator brake B is engaged. If the generator brake B is not engaged, then a generator brake engage control processing mechanism (not shown) of the generator control device 47 executes a generator brake engage control process and engages the generator brake B.

Next, the flow charts of FIGS. 7 to 9 will be described. In step S1, an initialization process is executed, in step S2, the accelerator pedal position AP and the brake pedal position BP are read, in step S3, the vehicle speed V is calculated and in step S4, the vehicle requirement torque TO* is determined.

In step S5, a determination is made as to whether the vehicle requirement torque TO* is greater than the drive motor maximum torque TMmax. If the vehicle requirement torque TO* is greater than the drive motor maximum torque TMmax, the operation proceeds to step S6. If the vehicle requirement torque TO* is equal to or less than the drive motor maximum torque TMmax, the operation proceeds to step S8. In step S6, a determination is made as to whether the engine 11 is stopped. If the engine 11 is stopped, the operation proceeds to step S7 where the sudden acceleration control process is executed and the process ends. Otherwise, if the engine is not stopped, the operation proceeds to step S8.

In step S8, the driver requirement output PD is calculated, in step S9, the battery charge/discharge requirement output PB is calculated, in step S10, the vehicle requirement output PO is calculated and in step S11, the operation point of the engine 11 is determined.

In step S12, a determination is made as to whether the engine 11 is in the drive area AR1. If the engine 11 is in the drive area AR1, the operation proceeds to step S13. Otherwise, the operation proceeds to step S14. In step S13, a determination is made as to whether the engine 11 is being driven. If the engine 11 is being driven, the operation proceeds to step S17. Otherwise, the operation proceeds to step S15 where the engine start control process is executed and the process thereafter ends.

In step S14, a determination is made as to whether the engine 11 is being driven. If the engine 11 is being driven, the operation proceeds to step S16 where the engine stop control process is executed and the operation ends. Otherwise, if the engine is not being driven, the operation proceeds to step S26.

In step S17, the engine control process is executed and in step S18, the generator target rotational speed NG* is determined. In step S19, a determination is made as to whether the absolute value of the generator target rotational speed NG* is equal to or higher than the first rotational speed Nth1. If the absolute value of the generator target rotational speed NG* is equal to or higher than the first rotational speed Nth1, the operation proceeds to step S20. If the absolute value of the generator target rotational speed NG* is smaller than the first rotational speed Nth1, the operation proceeds to step S21. In step S21, a determination is made as to whether the generator brake B is engaged. If the generator brake B is engaged, the operation ends. Otherwise, if the generator brake B is not engaged, the operation proceeds to step S22 where the generator brake engage control process is executed and the process ends.

In step S20, a determination is made as to whether the generator brake B is released. If the generator brake B is released, the operation proceeds to step S23. If the generator brake B is not released, the operation proceeds to step S24 where the generator brake release control process is executed and the process ends.

In step S23, a generator rotational speed control process is executed, in step S25, the drive shaft torque TR/OUT is estimated, in step S26, the drive motor target torque TM* is determined and in step S27, the drive motor control process is executed. The process then ends.

Figure 14:
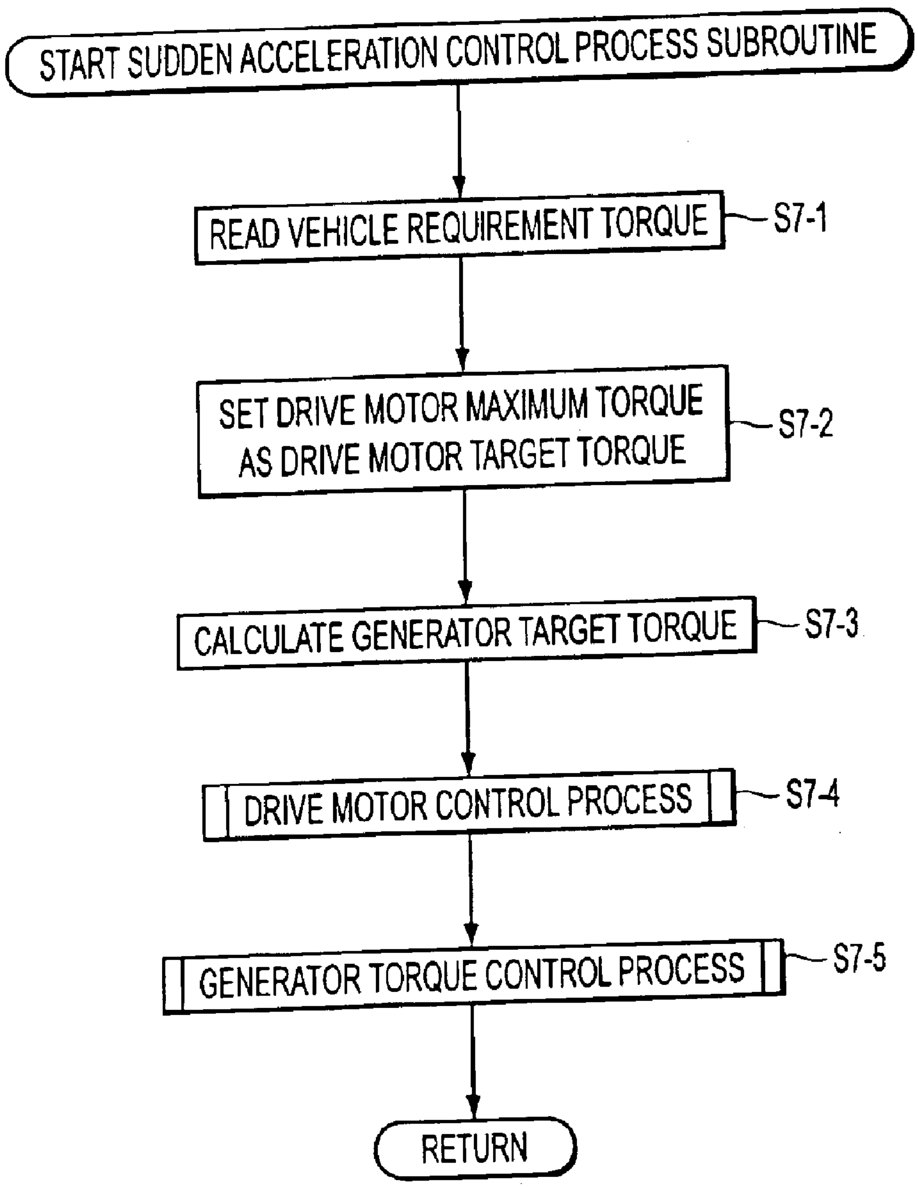
FIG. 14 is a drawing illustrating a subroutine of a sudden acceleration control process according to the first embodiment of the invention.

Next, a subroutine of the sudden acceleration control process in step S7 of FIG. 7 will be described. FIG. 14 is a drawing illustrating the subroutine of the sudden acceleration control process according to the first embodiment of the invention.

First, the sudden acceleration control processing mechanism reads the vehicle requirement torque TO* and sets the drive motor maximum torque TMmax as the drive motor target torque TM*. Then, a generator target torque calculation processing mechanism (not shown) of the vehicle control device 51 (FIG. 6) executes a generator target torque calculation process, in which it calculates a differential torque ΔT of the vehicle requirement torque TO* and the drive motor target torque TM*, and calculates and determines as the generator target torque TG* the amount that the drive motor maximum torque TMmax which is the drive motor target torque TM* is deficient, and sends the generator target torque TG* to the generator control device 47.

Then, the drive motor control processing mechanism executes the drive motor control process, and controls the torque of the drive motor 25 based on the drive motor target torque TM*. Furthermore, a generator torque control processing mechanism (not shown) of the generator control device 47 executes a generator torque control process, and controls the torque of the generator 16 based on the generator target torque TG*.

Next, the flow chart of FIG. 14 will be described. In step S7-1, the vehicle requirement torque TO* is read, in step S7-2, the drive motor maximum torque TMmax as the drive motor target torque TM* is set, in step S7-3, the generator target torque TG* is calculated, in step S74, drive motor control process is executed, and in step S7-5, the generator torque control process is executed and the operation returns.

Figure 15:
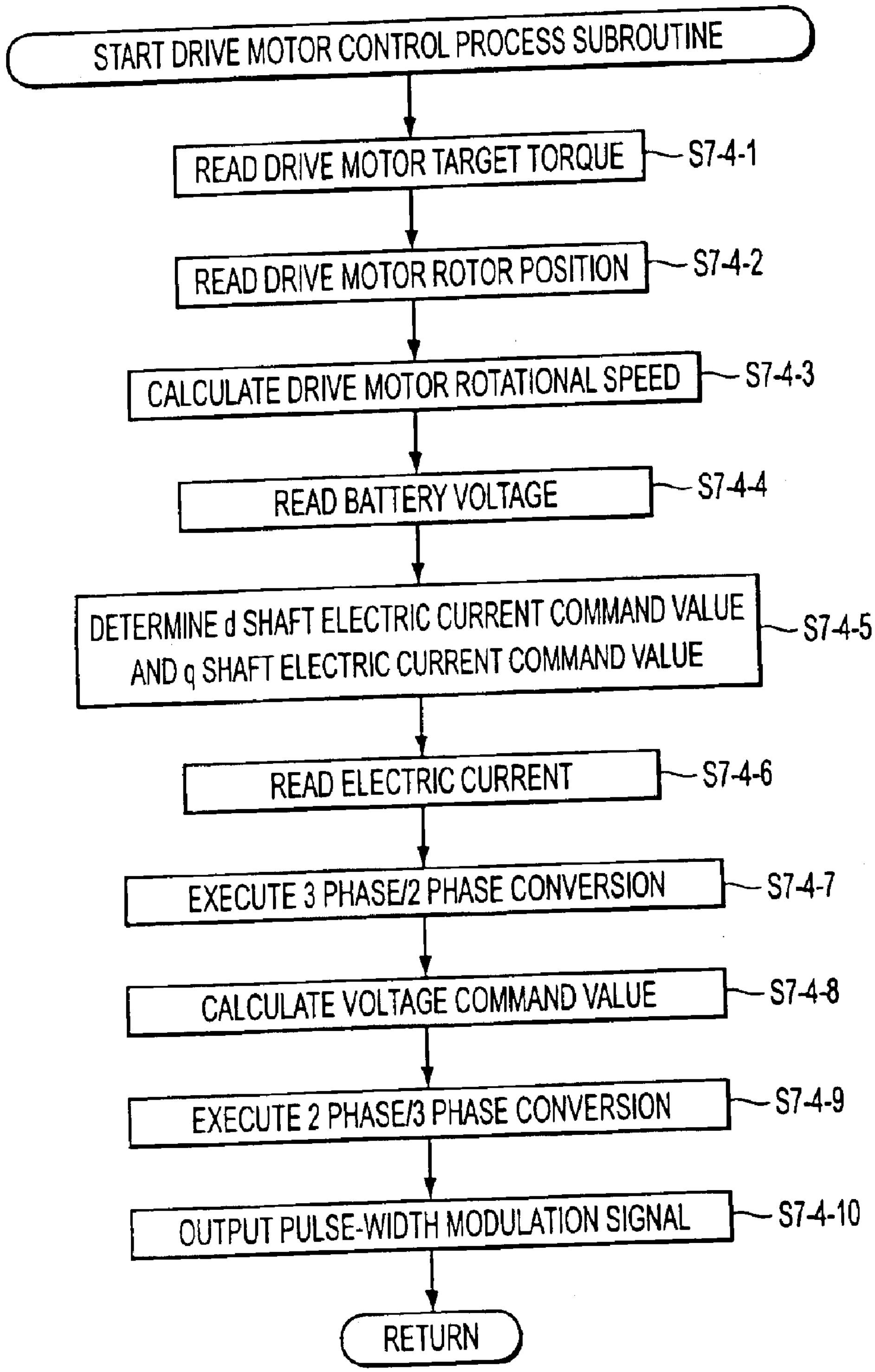
FIG. 15 is a drawing illustrating a subroutine of a drive motor control process according to the first embodiment of the invention.

Next, a subroutine of the drive motor control process in step S27 of FIG. 9 and step S7-4 of FIG. 14 will be described. FIG. 15 is a drawing illustrating the subroutine of the drive motor control process according to the first embodiment of the invention.

First, the drive motor control processing mechanism reads the drive motor target torque TM*. Next, the drive motor rotational speed calculation processing mechanism reads the drive motor rotor position θM, and calculates the drive motor rotational speed NM by calculating the changing rate ΔθM of the drive motor rotor position θM. Then, the drive motor control processing mechanism reads the battery voltage VB. In this case, the drive motor rotational speed NM and the battery voltage VB constitute an actual measurement value.

Next, the drive motor control processing mechanism calculates and determines a d shaft electric current command value IMd* and a q shaft electric current command value IMq* based on the drive motor target torque TM*, the drive motor rotational speed NM, and the battery voltage VB, with reference to the electric current command value map for drive motor control recorded in the recording equipment of the drive motor control device 49 (FIG. 6). In this case, the d shaft electric current command value IMd* and the q shaft electric current command value IMq* constitute an alternating current command value for the drive motor 25.

Furthermore, the drive motor control processing mechanism reads the electric currents IMU and IMV from the electric current sensors 68 and 69, and calculates the electric current IMW based on the electric currents IMU and IMV:

$$IMW=IMU-IMV$$

In this case, the electric current IMW may also be detected by an electric current sensor as is the case with the electric currents IMU and IMV.

Subsequently, an alternating current calculation processing mechanism of the drive motor control processing mechanism executes an alternating current calculation process to calculate a d shaft electric current IMd and a q shaft electric current IMq by executing 3 phase/2 phase conversion and converting the electric currents IMU, IMV, and IMW into the d shaft electric current IMd and the q shaft electric current IMq which are alternating currents. Then, an alternating voltage command value calculation processing mechanism of the drive motor control processing mechanism executes an alternating voltage command value calculation process, and calculates voltage command values VMd* and VMq* based on the d shaft electric current IMd and the q shaft electric current IMq, as well as the d shaft electric current command value IMd* and the q shaft electric current command value IMq*. Furthermore, the drive motor control processing mechanism executes 2 phase/3 phase conversion to convert the voltage command values VMd* and VMq* into the voltage command values VMU*, VMV*, and VMW*, calculates pulse-width modulation signals SU, SV, and SW based on the voltage command values VMU*, VMV*, and VMW*, and outputs the pulse-width modulation signals SU, SV and SW to a drive processing mechanism (not shown) of the drive motor control device 49. The drive processing mechanism executes a drive process, and sends the drive signal SG2 to the inverter 29 based on the pulse-width modulation signals SU, SV, and SW. In this case, the voltage command values VMd* and VMq* constitute an alternating voltage command value for the drive motor 25.

Next, the flow chart of FIG. 15 will be described. In this case, since the same process is executed in step S27 and step S7-4, the step S7-4 will be described. In step S7-4-1, the drive motor target torque TM* is read, in step S7-4-2, the drive motor rotor position θM is read, in step S7-4-3, the drive motor rotational speed NM is calculated, in step S7-4-4, the battery voltage VB is read, and in step S7-4-5, the d shaft electric current command value IMd* and the q shaft electric current command value IMq* are determined.

In step S7-4-6, the electric currents IMU and IMV are read, in step S7-4-7, 3 phase/2 phase conversion is executed, in step S7-4-8, the voltage command values VMd* and VMq* are calculated, in step S7-4-9, 2 phase/3 phase conversion is executed, and in step S7-4-10, pulse-width modulation signals SU, SV, and SW are output and the operation returns.

Figure 16:
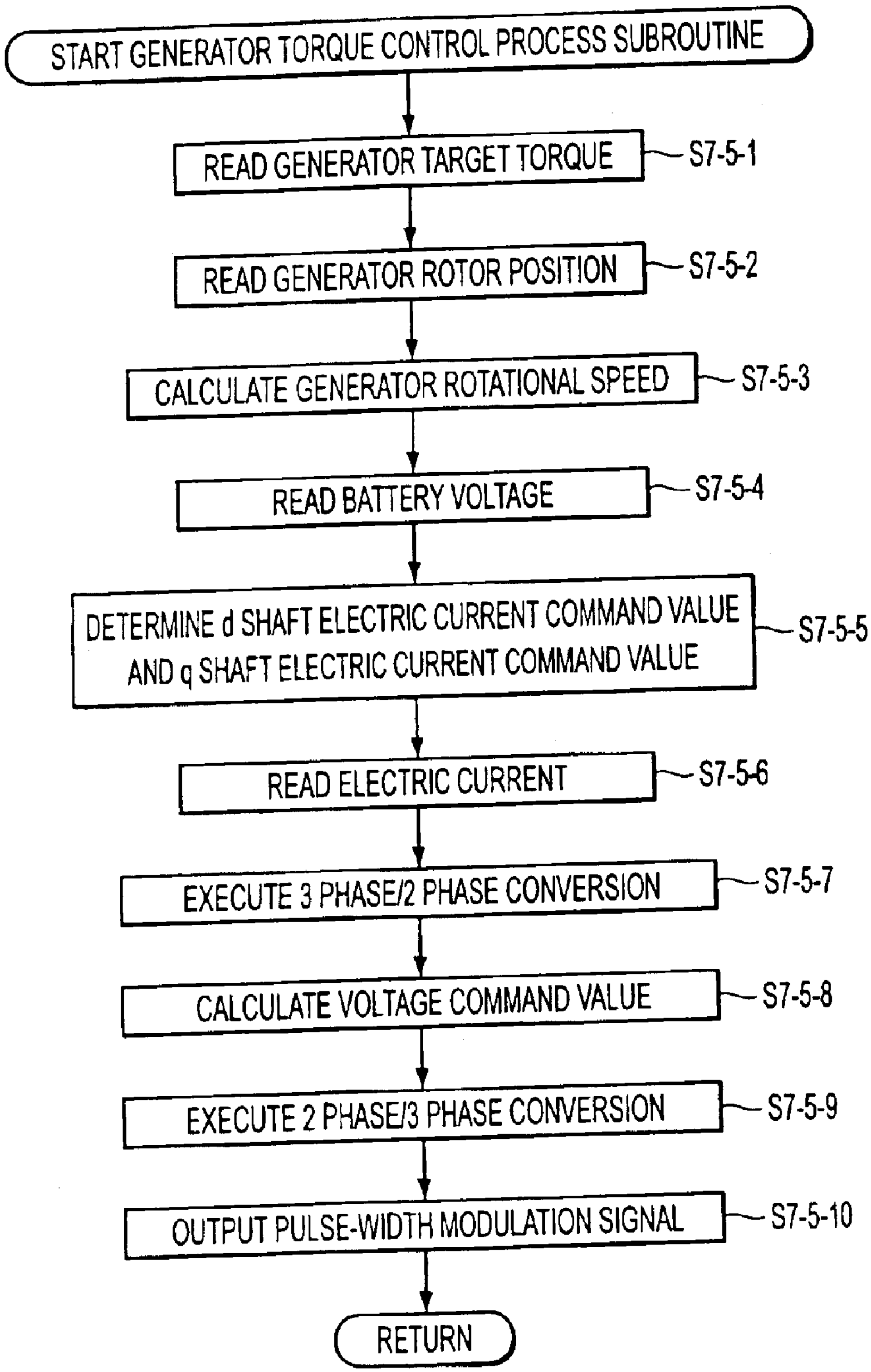
FIG. 16 is a drawing illustrating a subroutine of a generator torque control process according to the first embodiment of the invention.

Next, a subroutine of the generator torque control process in step S7-5 of FIG. 14 will be described. FIG. 16 is a drawing illustrating the subroutine of the generator torque control process according to the first embodiment of the invention.

First, the generator torque control processing mechanism reads the generator target torque TG*. Then, the generator rotational speed calculation processing mechanism reads the generator rotor position θG and calculates the generator rotational speed NG based on the generator rotor position θG. Subsequently, the generator torque control processing mechanism reads the battery voltage VB. Next, the generator torque control processing mechanism, based on the generator target torque TG*, the generator rotational speed NG, and the battery voltage VB, refers to the electric current command value map for generator control recorded in the recording equipment of the generator control device 47 (FIG. 6), and calculates and determines a d shaft electric current command value IGd* and a q shaft electric current command value IGq*. In this case, the d shaft electric current command value IGd* and the q shaft electric current command value IGq* constitute an alternating current command value for the generator 16.

Furthermore, the generator torque control processing mechanism reads the electric currents IGU and IGV from the electric current sensors 66 and 67, and calculates an electric current IGW based on the electric currents IGU and IGV:

$$IGW=IGU-IGV$$

However, the electric current IGW may also be detected by an electric current sensor as is the case with the electric currents IGU and IGV.

Subsequently, an alternating current calculation processing mechanism of the generator torque control processing mechanism executes an alternating current calculation process to calculate a d shaft electric current IGd and a q shaft electric current IGq by executing 3 phase/2 phase conversion and converting the electric currents IGU, IGV, and IGW into the d shaft electric current IGd and the q shaft electric current IGq. Then, an alternating voltage command value calculation processing mechanism of the generator torque control processing mechanism executes an alternating voltage command value calculation process, and calculates voltage command values VGd* and VGq* based on the d shaft electric current IGd and the q shaft electric current IGq, as well as the d shaft electric current command value IGd* and the q shaft electric current command value IGq*. Furthermore, the generator torque control processing mechanism executes 2 phase/3 phase conversion to convert the voltage command values VGd* and VGq* into the voltage command values VGU*, VGV*, and VGW*, calculates the pulse-width modulation signals SU, SV, and SW based on the voltage command values VGU*, VGV*, and VGW*, and outputs the pulse-width modulation signals SU, SV, and SW to a drive processing mechanism (not shown) of the generator control device 47. The drive processing mechanism executes the drive process, and sends the drive signal SG1 to the inverter 28 based on the pulse-width modulation signals SU, SV, and SW. In this case, the voltage command values VGd* and VGq* constitute an alternating voltage command value for the generator 16.

Next, the flow chart of FIG. 16 will be described. In step S7-5-1, the generator target torque TG* is read, in step S7-5-2, the generator rotor position θG is read, in step S7-5-3, the generator rotational speed NG is calculated, in step S7-5-4, the battery. voltage VB is read, and in step S7-5-5, the d shaft electric current command value IGd* and the q shaft electric current command value IGq* are determined. In step S7-5-6, the electric currents IGU and IGV are read, in step S7-5-7, 3 phase/2 phase conversion is executed, in step S7-5-8, the voltage command values VGd* and VGq* are calculated, in step S7-5-9, 2 phase/3 phase conversion is executed, and in step S7-5-9, pulse-width modulation signals SU, SV, and SW are output and the operation ends.

Figure 17:
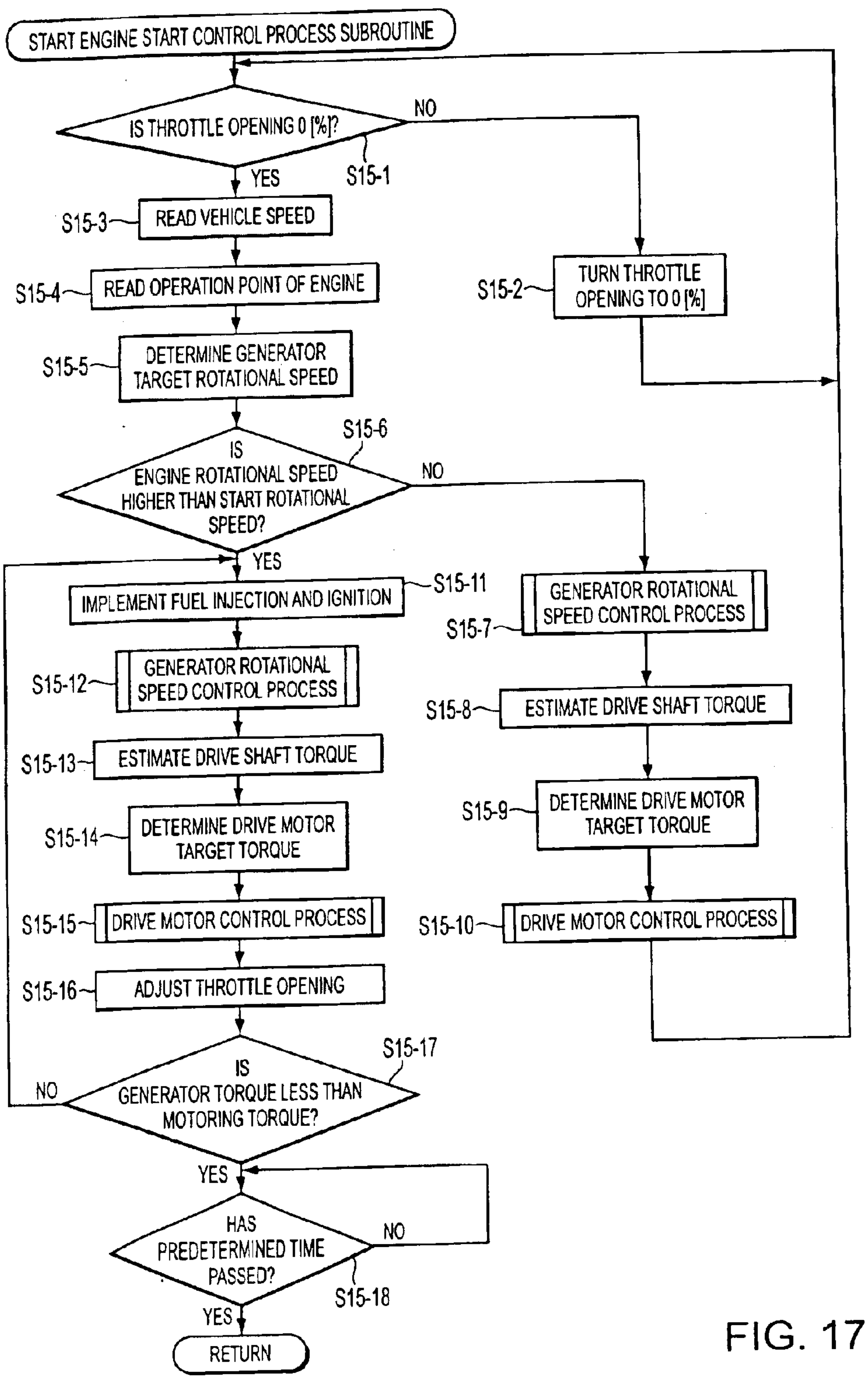
FIG. 17 is a drawing illustrating a subroutine of an engine start control process according to the first embodiment of the invention.

Next, a subroutine of the engine start control process in step S15 of FIG. 8 will be described. FIG. 17 is a drawing illustrating the subroutine of the engine start control process according to the first embodiment of the invention.

First, the engine start control processing mechanism reads the throttle opening θ. If the throttle opening θ is 0 [%], the engine start control processing mechanism reads the vehicle speed V calculated by the vehicle speed calculation processing mechanism, and reads the operation point of the engine 11 (FIG. 6) determined in the engine target operation state setting process.

Subsequently, as described earlier, the generator target rotational speed calculation processing mechanism executes the generator target rotational speed calculation process, in which it reads the drive motor rotor position θM to calculate the ring gear rotational speed NR based on the drive motor rotor position θM and the gear ratio γR, and reads the engine target rotational speed NE* at the operation point to calculate and determine the generator target rotational speed NG* based on the ring gear rotational speed NR and the engine target rotational speed NE* using the rotational speed relational expression.

The engine control device 46 then compares the engine rotational speed NE with a preset start rotational speed NEth1, and determines whether the engine rotational speed NE is higher than the start rotational speed NEth1. If the engine rotational speed NE is higher than the start rotational speed NEth1, the engine start control processing mechanism implements fuel injection and ignition of the engine 11.

Subsequently, the generator rotational speed control processing mechanism executes the generator rotational speed control process based on the generator target rotational speed NG*, so as to increase the generator rotational speed NG and therefore increase the engine rotational speed NE. Thereafter, as similarly carried out in steps S25 to step S27, the drive motor control device 49 estimates the drive shaft torque TR/OUT, determines the drive motor target torque TM*, and executes the drive motor control process.

Furthermore, the engine start control processing mechanism adjusts the throttle opening θ so that the engine rotational speed NE becomes the engine target rotational speed NE*. Next, in order to determine whether the engine 11 is being driven normally, the engine start control processing mechanism determines whether the generator torque TG is less than a motoring torque TEth involved in the start of the engine 11, and waits a predetermined time period with the generator torque TG less than the motoring torque TEth.

On the other hand, if the engine rotational speed NE is equal to or lower than the start rotational speed NEth1, the generator rotational speed control processing mechanism executes the generator rotational speed control process based on the generator target rotational speed NG*. Then, as similarly carried out in steps S25 to S27, the drive motor control device 49 estimates the drive shaft torque TR/OUT, determines the drive motor target torque TM*, and executes the drive motor control process.

Next the flow chart of FIG. 17 will be described. In step S15-1, a determination is made as to whether the throttle opening θ is 0 [%]. If the throttle opening θ is 0 [%], the operation proceeds to step S15-3. Otherwise, if the throttle opening is not 0 [%], the operation proceeds to step SI 5-2 where the throttle opening θ is turned to 0 [%], and the operation returns to step S15-1.

In step S15-3, the vehicle speed V is read, in step S15-4, the operation point of the engine 11 is read, and in step S15-5, the generator target rotational speed NG* is determined. In step S15-6, a determination is made as to whether the engine rotational speed NE is higher than the start rotational speed NEth1. If the engine rotational speed NE is higher than the start rotational speed NEth1, the operation proceeds to step S15-11. If the engine rotational speed NE is equal to or lower than the start rotational speed NEth1, the operation proceeds to step S15-7.

In step S15-7, the generator rotational speed control process is executed, in step S15-8, the drive shaft torque TR/OUT is estimated, in step S15-9, the drive motor target torque TM* is determined, and in step S15-10, the drive motor control process is executed and the operation returns to step 15-1. In step S15-11, fuel injection and ignition is implemented, in step S15-12, the generator rotational speed control process is executed, in step S15-13, the drive shaft torque TR/OUT is estimated in step S15-14, the drive motor target torque TM* is determined, in step S15-15, the drive motor control process is executed, and in step S15-16, the throttle opening θ is adjusted.

In step S15-17, a determination is made as to whether the generator torque TG is less than the motoring torque TEth. If the generator torque TG is less than the motoring torque TEth, the operation proceeds to step S15-18. If the generator torque TG is equal to or greater than the motoring torque TEth, the operation returns to step S15-11. In step S15-18, a predetermined time period elapses, and the operation returns on the elapse of the predetermined time period.

Figure 18:
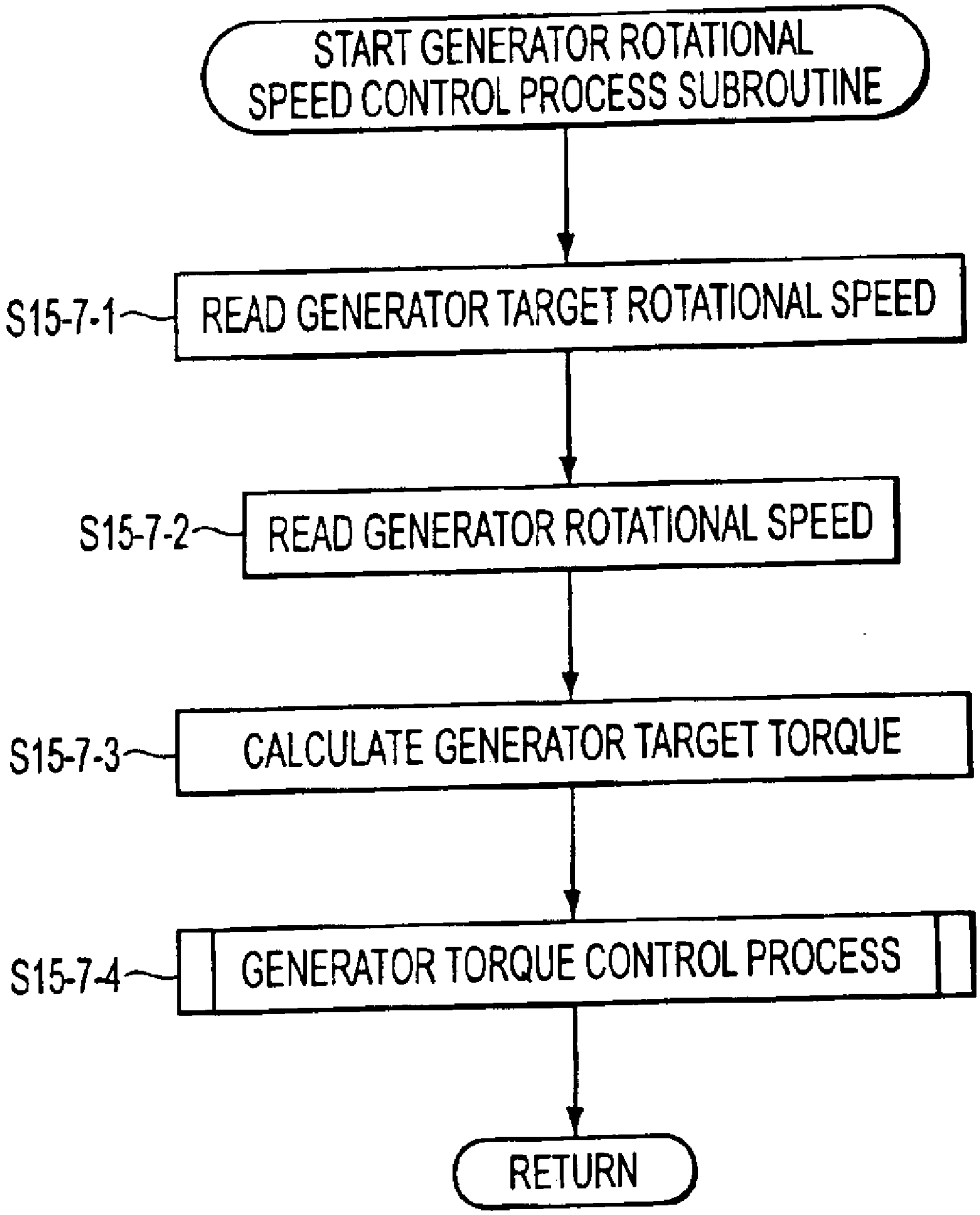
FIG. 18 is a drawing illustrating a subroutine of a generator rotational speed control process according to the first embodiment of the invention.

Next, a subroutine of the generator rotational speed control process in step S23 of FIG. 9 and steps S15-7 and S15-12 of FIG. 17 will be described. FIG. 18 is a drawing illustrating the subroutine of the generator rotational speed control process according to the first embodiment of the invention.

First, the generator rotational speed control processing mechanism reads the generator target rotational speed NG* and the generator rotational speed NG. Then, the generator rotational speed control processing mechanism executes PI control based on a differential rotational speed ΔNG of the generator target rotational speed NG* and the generator rotational speed NG, and calculates the generator target torque TG*. In this case, the greater the differential rotational speed ΔNG, the greater the generator target torque TG* is increased, with the positive-negative sign being considered. Subsequently, the generator torque control processing mechanism executes the generator torque control process of FIG. 16 to control the torque of the generator 16 (FIG. 6).

Next, the flow chart of FIG. 18 will be described. In this case, since the same process is executed in step S23, and steps S15-7 and S15-12, the step S15-7 will be described. In step S15-7-1, the generator target rotational speed NG* is read, in step S15-7-2, the generator rotational speed NG is read, in step S15-7-3, the generator target torque TG* is calculated, and in step S15-7-4, generator torque control process is executed and the operation returns.

Figure 19:
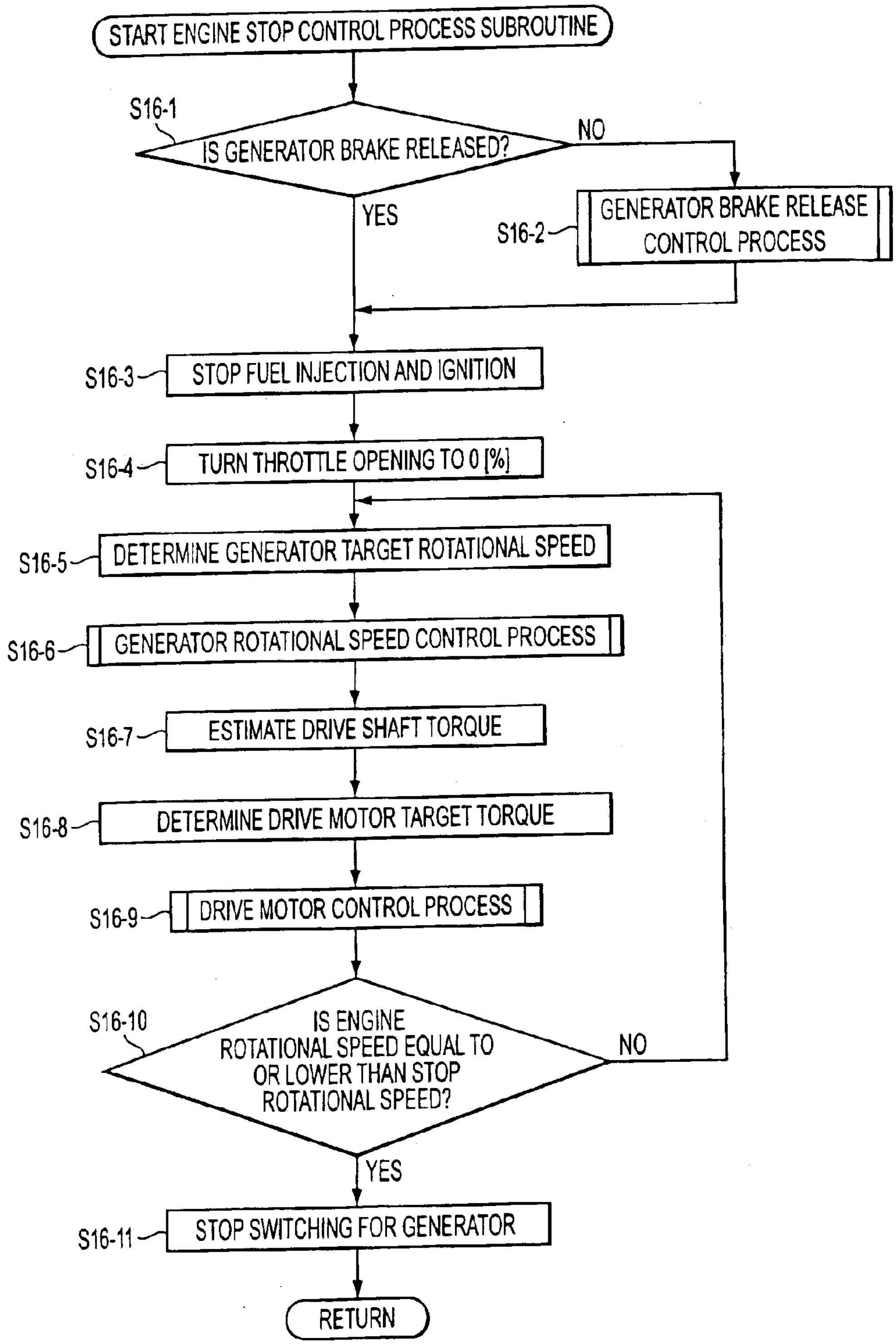
FIG. 19 is a drawing illustrating a subroutine of an engine stop control process according to the first embodiment of the invention.

Next, a subroutine of the engine stop control process in step S16 of FIG. 8 will be described. FIG. 19 is a drawing illustrating the subroutine of the engine stop control process according to the first embodiment of the invention.

First, the generator control device 47 (FIG. 6) determines whether the generator brake B is released. If the generator brake B is engaged and not released, the generator brake release control processing mechanism executes the generator brake release control process and releases the generator brake B. On the other hand, if the generator brake B is released, the engine stop control processing mechanism stops fuel injection and ignition in the engine 11, and turns the throttle opening θ to 0 [%].

Subsequently, the engine stop control processing mechanism reads the ring gear rotational speed NR and determines the generator target rotational speed NG* based on the ring gear rotational speed NR and the engine target rotational speed NE* (0 [rpm]) using the rotational speed relational expression. After the generator control device 47 executes the generator rotational speed control process in FIG. 18, as similarly carried out in steps S25 to S27, the drive motor control device 49 estimates the drive shaft torque TR/OUT, determines the drive motor target torque TM*, and executes the drive motor control process.

Next, the generator control device 47 determines whether the engine rotational speed NE is equal to or lower than a stop rotational speed NEth2. If the engine rotational speed NE is equal to or lower than the stop rotational speed NEth2, the generator control device 47 stops the switching for the generator 16 to shut down the generator 16.

Next, the flow chart of FIG. 19 will be described. In step S16-1, a determination is made as to whether the generator brake B is released. If the generator brake B is released, the operation proceeds to step S16-3. If the generator brake B is not released, the operation proceeds to step S16-2 where generator brake release control process is executed. In step S16-3, fuel injection and ignition is stopped, in step S16-4, the throttle opening θ is turned to 0 [%], in step S16-5, the generator target rotational speed NG* is determined, in step S16-6, the generator rotational speed control process is executed, in step S16-7, the drive shaft torque TR/OUT is estimated, in step S16-8, the drive motor target torque TM* is determined, and in step S16-9, drive motor control process is executed, in step S16-10, a determination is made as to whether the engine rotational speed NE is equal to or lower than the stop rotational speed NEth2. If the engine rotational speed NE is equal to or lower than the stop rotational speed NEth2, the operation proceeds to step S16-11. If the engine rotational speed NE is greater than the stop rotational speed NEth2, the operation returns to step S16-5. In step S16-11, the switching for the generator 16 is stopped and the operation returns.

Figure 20:
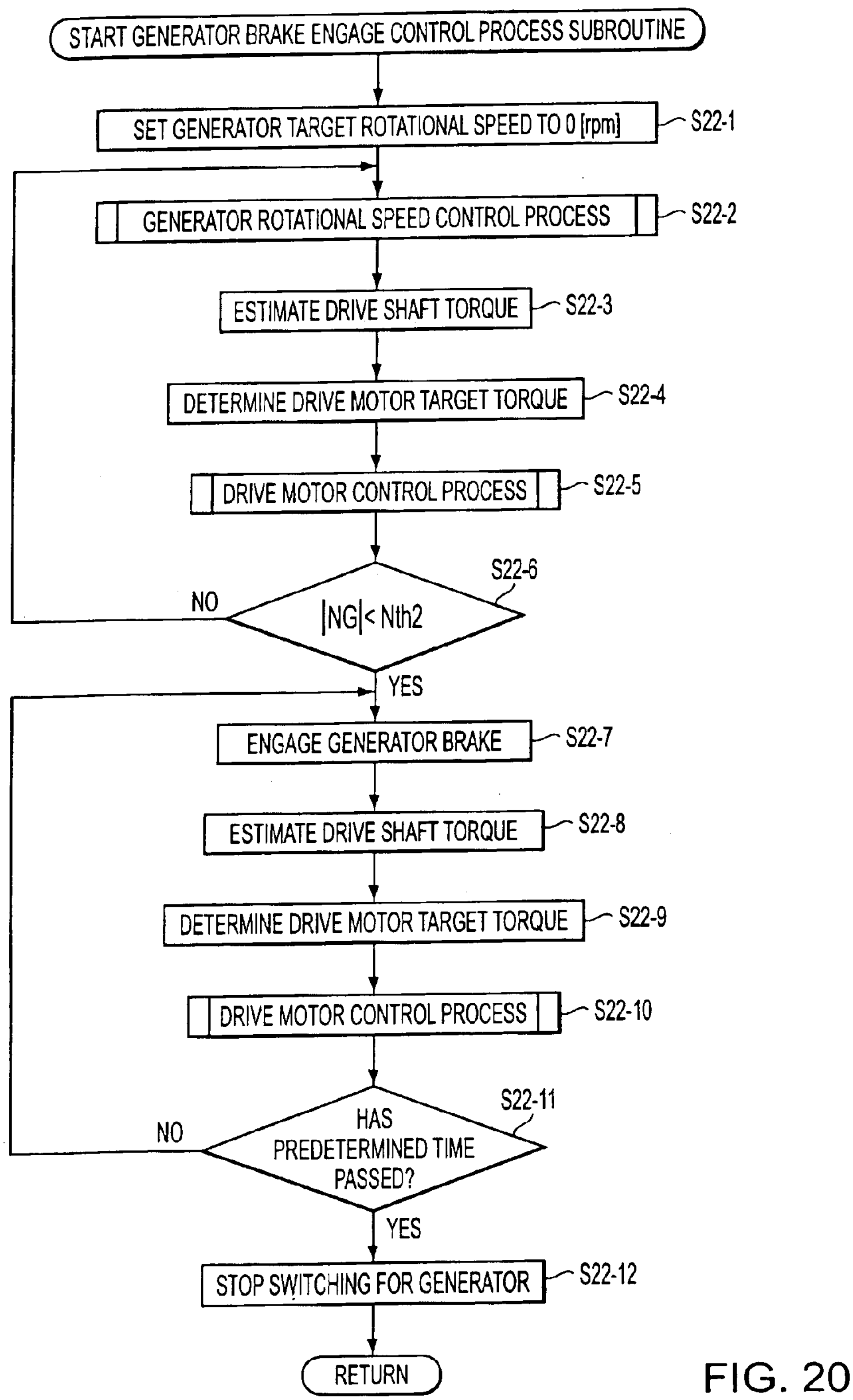
FIG. 20 is a drawing illustrating a subroutine of a generator brake engage control process according to the first embodiment of the invention.

Next, a subroutine of the generator brake engage control process in step S22 of FIG. 9 will be explained. FIG. 20 is a drawing illustrating the subroutine of the generator brake engage control process according to the first embodiment of the invention.

First, the generator brake engage control processing mechanism changes the generator brake requirement for requiring the engagement of the generator brake B (FIG. 6) from OFF to ON, and sets the generator target rotational speed NG* to 0 [rpm]. After the generator control device 47 executes the generator rotational speed control process in FIG. 18, as similarly carried out in steps S25 to S27, the drive motor control device 49 estimates the drive shaft torque TR/OUT, determines the drive motor target torque TM*, and executes the drive motor control process.

Next, the generator brake engage control processing mechanism determines whether the absolute value of the generator rotational speed NG is smaller than a predetermined second rotational speed Nth2 (for example, 100 [rpm]), and engages the generator brake B if the absolute value of the generator rotational speed NG is smaller than the second rotational speed Nth2. Subsequently, as similarly carried out in steps S25 to S27, the drive motor control device 49 estimates the drive shaft torque TR/OUT, determines the drive motor target torque TM*, and executes the drive motor control process.

Then, after a predetermined time period has passed with the generator brake B engaged, the generator brake engage control processing mechanism stops the switching for the generator 16 to shut down the generator 16.

Next, the flow chart of FIG. 20 will be described. In step S22-1, the generator target rotational speed NG* is set to 0 [rpm], in step S22-2, the generator rotational speed control process is executed, in step S22-3, the drive shaft torque TR/OUT is estimated, in step S22-4, the drive motor target torque TM* is determined, and in step S22-5, drive motor control process is executed. In step S22-6, a determination is made as to whether the absolute value of the generator rotational speed NG is smaller than the second rotational speed Nth2. If the absolute value of the generator rotational speed NG is smaller than the second rotational speed Nth2, the operation proceeds to step S22-7. If the absolute value of the generator rotational speed NG is equal to or greater than the second rotational speed Nth2, the operation returns to step S22-2.

In step S22-7, the generator brake B is engaged, in step S22-8, the drive shaft torque TR/OUT is estimated, in step S22-9, the drive motor target torque TM* is determined, and in step S22-10, the drive motor control process is executed. In step S22-11, a determination is made as to whether a predetermined time period has passed. If the predetermined time period has passed, the operation proceeds to step S22-12 where the switching for the generator 16 is stopped and the operation returns. Otherwise, the operation returns to step S22-7.

Figure 21:
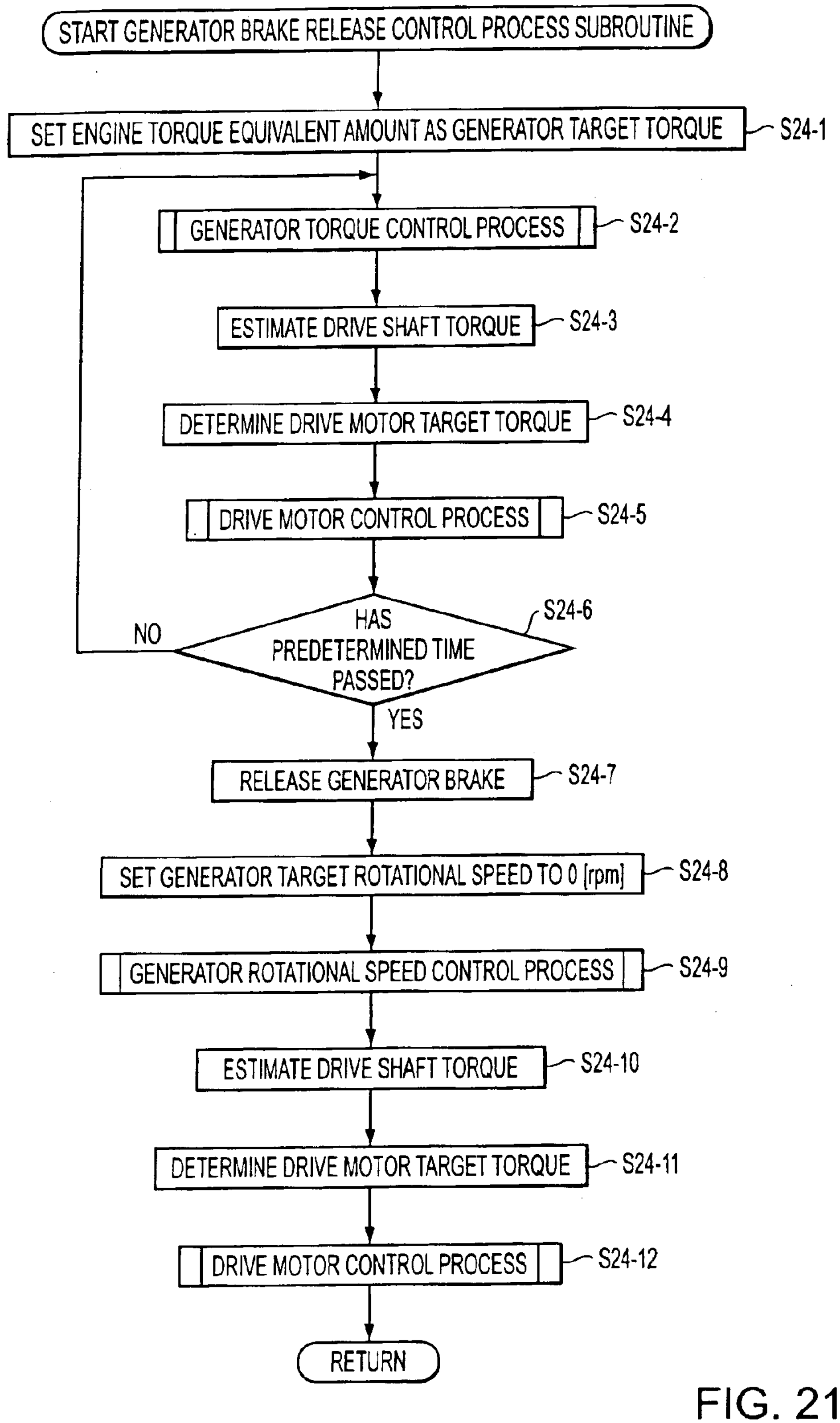
FIG. 21 is a drawing illustrating a subroutine of a generator brake release control process according to the first embodiment of the invention.

Next, a subroutine of the generator brake release control process in step S24 of FIG. 9 will be described. FIG. 21 is a drawing illustrating the subroutine of the generator brake release control process according to the first embodiment of the invention.

In the generator brake engage control process, while the generator brake B (FIG. 6) is engaged, a predetermined engine torque TE is applied to the rotor 21 of the generator 16 as a reaction force. Therefore, when the generator brake B is simply released, the engine torque TE is transmitted to the rotor 21, causing a great change in the generator torque TG and the engine torque TE, thereby generating a shock.

Therefore, in the engine control device 46, the engine torque TE that is transmitted to the rotor 21 is estimated or calculated, and the generator brake release control processing mechanism reads the torque equivalent to the estimated or calculated engine torque TE, i.e., engine torque equivalent, and sets the engine torque equivalent as the generator target torque TG*. Then, after the generator torque control processing mechanism executes the generator torque control process in FIG. 16, as similarly carried out in steps S25 to S27, the drive motor control device 49 estimates the drive shaft torque TR/OUT, determines the drive motor target torque TM*, and executes the drive motor control process.

When a predetermined time period has passed after the start of the generator torque control process, the generator brake release control processing mechanism releases the generator brake B and sets the generator target rotational speed NG* to 0 [rpm]. Then, the generator rotational speed control mechanism executes the generator rotational speed control process in FIG. 18. Subsequently, as similarly carried out in steps S25 to S27, the drive motor control device 49 estimates the drive shaft torque TR/OUT, determines the drive motor target torque TM*, and executes the drive motor control process. In this case, the engine torque equivalent is estimated or calculated by learning the torque ratio of the generator torque TG to the engine torque TE.

Next, the flow chart of FIG. 21 will be described. In step S24-1, the engine torque equivalent is set as the generator target torque TG*, in step S24-2, the generator torque control process is executed, in step S24-3, the drive shaft torque TR/OUT is estimated, in step S24-4, the drive motor target torque TM* is determined, and in step S24-5, drive motor control process is executed.

In step S24-6, a determination is made as to whether a predetermined time period has passed. If the predetermined time period has passed, the operation proceeds to step S24-7. If not, the operation returns to step S24-2. In step S24-7, the generator brake B is released, in step S24-8, the generator target rotational speed NG* is set to 0 [rpm], in step S24-9, the generator rotational speed control process is executed, in step S24-10, the drive shaft torque TR/OUT is estimated, in step S24-11, the drive motor target torque TM* is determined, and in step S24-12, drive motor control process is executed and the process returns.

Meanwhile, in the engine target operation state setting process, as shown in FIG. 12, the points A1 to A3, and Am at which the lines PO1, PO2, . . . which indicate the vehicle requirement output PO intersect the optimum fuel consumption curve L where the engine 11 reaches maximum efficiency, at each accelerator pedal position AP1 to AP6, are determined as operation points of the engine 11 which are engine target operation states, and engine torque TE1 to TE3 and TEm at the operation points are determined as the engine target torque TE*.

Therefore, when the vehicle requirement output PO becomes smaller as the vehicle requirement torque TO* becomes smaller, the engine target torque TE* is also reduced. If the vehicle requirement output PO becomes smaller than a predetermined value, however, it is not possible to accordingly reduce the engine target torque TE*. Thus, the excessive or deficient amount of torque of the engine torque TE with respect to the vehicle requirement torque TO* is compensated for using the drive motor 25.

On the other hand, if the engine torque TE is greater than the vehicle requirement torque TO*, a regenerative processing mechanism (not shown) of the vehicle control device 51 executes a regenerative process, calculates the amount that the engine torque TE has exceeded the vehicle requirement torque TO*, and sends the calculated excessive amount to the drive motor control device 49 as regenerative target torque. Then, the drive motor control device 49 drives the drive motor 25 based on the regenerative target torque to absorb as regenerative torque the drive motor torque TM that corresponds to the excessive amount of torque, and generates electrical energy to charge the battery 43.

To accomplish this, a regenerative control processing mechanism (not shown) of the drive motor control device 49 executes a regenerative control process, sends the drive signal SG2 to the inverter 29 and drives the inverter 29. As a result, the alternating current generated in the drive motor 25 is converted to direct current in the inverter 29. Then, the direct current is sent to the battery 43 and regenerative torque is generated in the drive motor 25.

Meanwhile, when the hybrid vehicle is driven with the amount of engine torque TE in excess of the vehicle requirement torque TO* absorbed by the drive motor 25 as regenerative torque, electrical energy is generated in the drive motor 25. However, when, for example, overheating of the drive motor 25 occurs along with the generation of electrical energy, then it becomes necessary to limit the regenerative torque.

Therefore, the index determination processing mechanism 9 (FIG. 1) of the vehicle control device 51 executes an index determination process, reads the temperature tmM of the coil 42 detected by the drive motor temperature sensor 65 and determines whether the temperature tmM has exceeded a threshold value tmMth, i.e., whether the temperature tmM has become higher than the threshold value tmMth. If the temperature tmM has become higher than the threshold value tmMth, the torque limit processing mechanism 92 of the vehicle control device 51 executes a torque control process to limit the regenerative torque. Therefore, the torque limit processing mechanism 92 limits and reduces the drive motor target torque TM* during regeneration. In this case, the temperature tmM of the coil 42 indicates the torque limit index that is the index for limiting regenerative torque when regenerative torque is absorbed by the drive motor 25. Furthermore, a drive motor drive portion is constituted by the drive motor 25.

Figure 22:
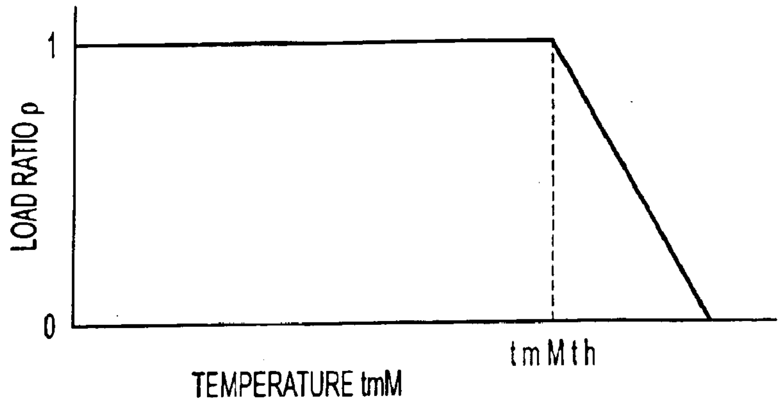
FIG. 22 is a drawing illustrating a limiting method for drive motor target torque according to the first embodiment of the invention.

FIG. 22 is a drawing illustrating a limiting method for drive motor target torque according to the first embodiment of the invention. In the drawing, the x-axis is the temperature tmM and the y-axis is the limit ratio ρ. As shown in the drawing, when the temperature tmM is equal to or lower than the threshold value tmMth, the limit ratio ρ is 1 and the drive motor target torque TM* during regeneration is not limited. On the other hand, when the temperature tmM becomes higher than the threshold value tmMth, the limit ratio ρ decreases as the temperature tmM increases, and thus the drive motor target torque TM* is limited and becomes ρ·TM*.

In this embodiment, when the temperature tmM becomes higher than the threshold value tmMth, the limit value ρ is gradually reduced as expressed by a linear function, but it can also be reduced using another function. Furthermore, in addition to the case where the drive motor 25 has overheated and a temperature of the drive motor 25 (FIG. 6), for example, the temperature tmM of the coil 42, has become higher than the threshold value tmMth, the case where a temperature of the inverter 29, a temperature of the cooling oil for cooling the drive motor 25, or the like, has become higher than a threshold value or the case where an abnormal state has occurred in the hybrid vehicle drive device may also be considered as a state that requires limiting of the regenerative torque. In this case, a temperature sensor such as an inverter temperature sensor for detecting a temperature of the inverter 29 or a cooling oil temperature sensor for detecting a temperature of the cooling oil that cools the drive motor 25 is provided as the torque limit index detection portion in place of the drive motor temperature sensor 65. When the temperature of the inverter 29, the temperature of the cooling oil for cooling the drive motor 25, or the like, has become higher than the respective threshold value or an abnormal state has occurred in the hybrid vehicle drive device, the sending of the drive signal SG2 to the inverter 29 is stopped. The drive of the inverter 29 is therefore stopped, thus limiting the regenerative torque in the drive motor 25.

In this case, the drive motor drive portion comprises the drive motor 25, the inverter 29 and a cooling system of the drive motor 25, and the drive motor drive portion temperature that indicates the torque limit index comprises the temperature of the drive motor 25, the temperature of the inverter 29, the temperature of the cooling oil and the like.

Furthermore, a state where a drive motor inverter voltage VM, a drive motor inverter current IM, an electrical output or the like, generated on the input port side of the inverter 29 in accordance with regeneration is decreased equal to or lower than a threshold may also be considered as the state that requires limiting of the regenerative torque. In this case, a drive motor inverter voltage sensor 76 for detecting the drive motor inverter voltage VM, a drive motor inverter current sensor 78 for detecting the drive motor inverter current IM, and an electrical output calculation processing mechanism for detecting the electrical output constitutes the torque limit index detection portion, so that when the drive motor inverter voltage VM, the drive motor inverter current IM, and the electrical output has become higher than the threshold value, the sending of the drive signal SG2 to the inverter 29 is stopped. The drive of the inverter 29 is therefore stopped, thus limiting the regenerative torque in the drive motor 25. Furthermore, an electrical output calculation processing mechanism (not shown) of the drive motor control device 49 may also execute an electrical output calculation process to calculate an electrical output based on the voltage and the current, so that when the calculated electrical output has exceeded a threshold value, the sending of the drive signal SG2 to the inverter 29 is stopped. The drive of the inverter 29 is therefore stopped, thus limiting the regenerative torque in the drive motor 25.

In this case, the drive motor drive portion comprises the inverter 29, and the electrical variable that indicates the torque limit index comprises the drive motor inverter voltage VM, the drive motor inverter current IM, and the electrical output. Furthermore, the torque limit index detection portion comprises the drive motor inverter voltage sensor 76, the drive inverter current sensor 78 and the electrical output calculation mechanism.

Meanwhile, when the regenerative torque is limited in the torque limit process executed by the torque limit processing mechanism 92 (FIG. 1), and therefore the drive motor target torque TM* is limited, the amount of engine torque TE in excess of the vehicle requirement torque TO* is absorbed by the drive motor 25 as regenerative torque. If the regenerative torque is limited, an engine torque TE greater than the vehicle requirement torque TO* is transmitted to the drive wheel 37, thereby imparting an unpleasant sensation to the driver.

Therefore, the engine control processing mechanism limits the engine torque TE by only the amount that the regenerative torque is limited. Specifically, the engine control processing mechanism limits the engine torque TE so that the sum of the limited regenerative torque and the engine torque TE satisfies the vehicle requirement torque TO*, and therefore limiting the engine target torque TE*.

Figure 23:
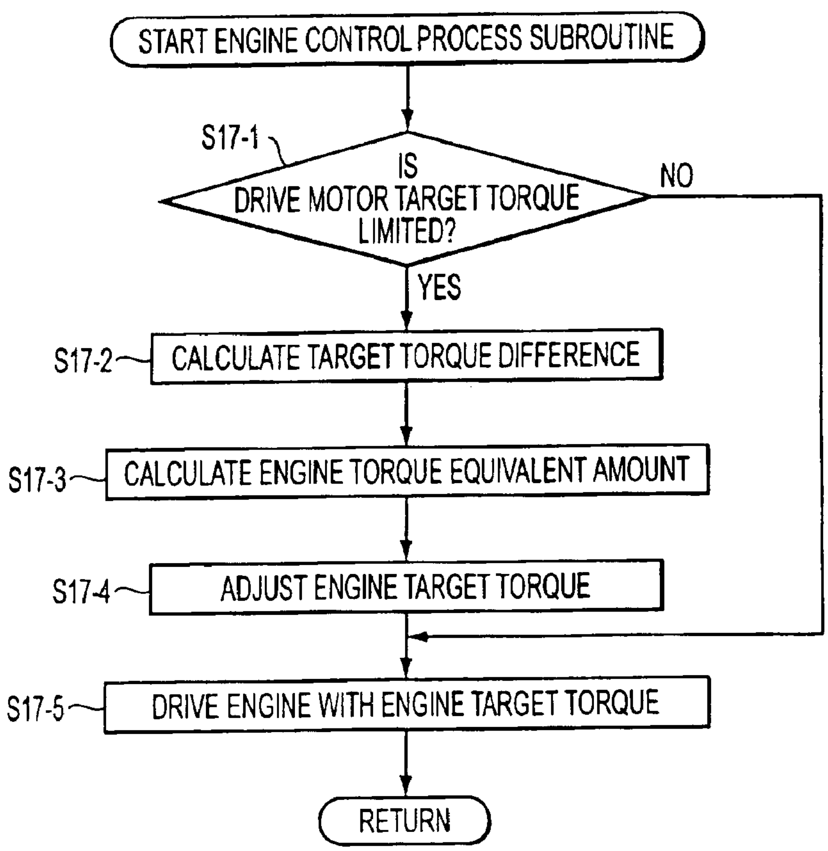
FIG. 23 is a drawing illustrating a subroutine of an engine control process according to the first embodiment of the invention.
Figure 24:
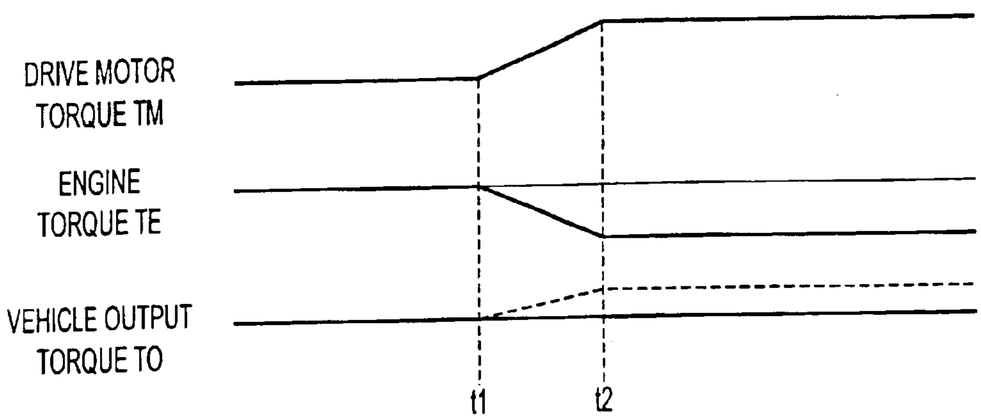
FIG. 24 is a first time chart illustrating an operation of the engine control process according to the first embodiment of the invention.
Figure 25:
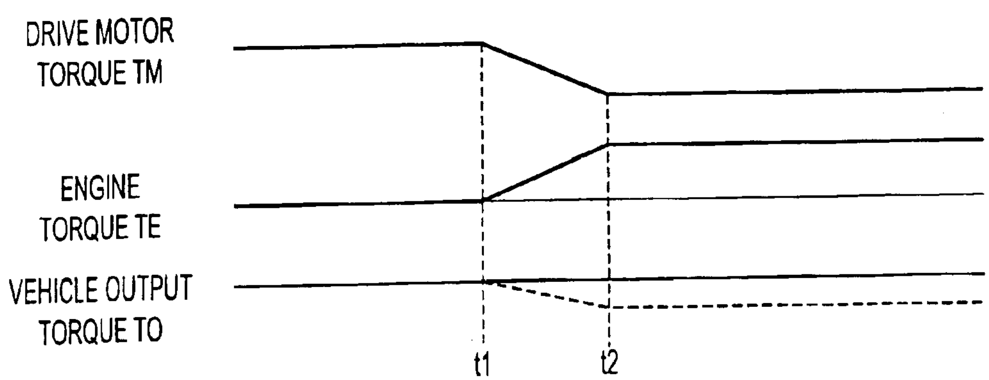
FIG. 25 is a second time chart illustrating the operation of the engine control process according to the first embodiment of the invention.

A subroutine of the engine control process in step S17 of FIG. 8 will hereafter be explained. FIG. 23 is a drawing illustrating the subroutine of the engine control process according to the first embodiment of the invention, FIG. 24 is a first time chart illustrating an operation of the engine control process according to the first embodiment of the invention, and FIG. 25 is a second time chart illustrating the operation of the engine control process according to the fist embodiment of the invention.

First, a torque limit determination processing mechanism (not shown) of the engine control processing mechanism executes a torque limit determination process, and determines whether the regenerative torque is limited according to whether the drive motor target torque TM* is limited. If the drive motor target torque TM* is limited, and the regenerative torque is limited, the engine torque adjustment processing mechanism 93 (FIG. 1) of the engine control processing mechanism executes an engine torque adjustment process and adjusts the engine torque TE. To accomplish this, the engine torque adjustment processing mechanism 93 calculates the difference between the drive motor target torque TM* before limiting and the drive motor target torque ρ·TM* after limiting, i.e., the target torque difference ΔTM*:

$$\Delta TM^* = TM^* - \rho \cdot TM^*$$

Next, the engine torque adjustment processing mechanism 93 calculates an engine torque equivalent ΔTE* of the target torque difference ΔTM* in order to adjust the engine target torque TE* by only the limited amount of the drive motor target torque TM*, i.e., only the amount of the target torque difference ΔTM*:

$$\Delta TE^* = \gamma em \cdot \Delta TM^*$$

In this case, γem is a gear ratio from the engine 11 (FIG. 2) to the drive motor 25. When a gear ratio from the engine 11 to the drive wheel 37 (the same as the gear ratio from the engine 11 to the pinion (not shown) of the differential device 36) is γew and a gear ratio from the drive motor 25 to the drive wheel 37 is γ mw, the gear ratio γem is calculated as follows:

$$\gamma em = \gamma ew / mw$$

Next, the engine torque adjustment processing mechanism 93 adjusts the engine target torque TE* by only the amount of the engine torque equivalent ΔTE*. If the engine target torque after adjustment is represented as TEη*, then the engine target torque TEη* can be calculated as follows:

$$TE\acute{\eta}^* = TE^* + \Delta TE^*$$

In this case, the drive motor target torque TM* and ρ·TM* are values during regeneration and assume negative values. Furthermore, because TM*<ρ·TM*, the target torque difference ΔTM* also assumes a negative value and the engine torque equivalent ΔTE* also assumes a negative value. In this way, if the engine target torque TE* is adjusted, the engine control processing mechanism sets the limited engine target torque TEη* as the engine target torque TE* and drives the engine 11.

Therefore, for example, during regeneration of the drive motor 25, if the temperature tmM in timing t1 becomes higher than the threshold value tmMth, then the regenerative torque is limited from the timing t1 to the timing t2, and the drive motor target torque TM* is limited and increased (the absolute value |TM*| is reduced) by only the amount of the target torque difference ΔTM*. Therefore, as shown in FIG. 24, the drive motor torque TM (regenerative torque) during regeneration is gradually increased (the absolute value |TM| is reduced) from the timing t1 to the timing t2.

Then, as the drive motor target torque TM* is limited, the engine target torque TE* is limited and reduced by only the amount of the engine torque equivalent ΔTE*. Therefore, as shown in FIG. 24, the engine torque TE during regeneration is gradually reduced from the timing t1 to the timing t2.

As a result, a vehicle output torque TO, obtained by adding together the drive motor torque TM and the engine torque TE, assumes a constant value without being varied from the timing t1 to the timing t2. In this way, when a torque limit index has exceeded a threshold value and it has become necessary to limit the regenerative torque of the drive motor 25, the engine torque TE is limited and reduced by that amount only. Therefore, an engine torque TE greater than the vehicle requirement torque TO* is not transmitted to the drive wheel 37, thus an unpleasant sensation is not imparted to the driver.

Note that the broken lines in FIG. 24 indicate the vehicle output torque TO when the engine target torque inverter voltage has not been adjusted when the regenerative torque is limited. Meanwhile, if the vehicle requirement output PO becomes larger as the vehicle requirement torque TO* becomes larger, the engine target torque TE* is also made to increase. If the vehicle requirement torque TO* becomes greater than a predetermined value, however, it is not possible to accordingly increase the engine target torque TE*. Thus, a powering control processing mechanism (not shown) of the vehicle control device 51 (FIG. 6) executes a powering control process, calculates the deficient amount by which the engine target torque TE* is deficient with respect to the vehicle requirement torque TO*, and sends the calculated deficient amount to the drive motor control device 49 as powering target torque. Then, the drive motor control device 49 drives the drive motor 25 based on the powering target torque and supplements as powering torque the drive motor torque TM corresponding to the deficient amount.

Meanwhile, if the temperature tmM becomes greater than the threshold value tmMth for some reason during powering of the drive motor 25, the index determination processing mechanism 91 reads the temperature tmM of the coil 42 detected by the drive motor temperature sensor 65 which is the torque limit index detection portion, and determines whether the temperature tmM has exceeded the threshold value tmMth, i.e., whether the temperature tmM has become higher than the threshold value tmMth. If the temperature tmM has become higher than the threshold value tmMth, the torque limit processing mechanism 92 executes a torque control process and limits and reduces the powering torque.

To accomplish this, the torque limit processing mechanism 92 limits the drive motor target torque TM* during powering (positive value) and reduces it by only the amount of the target torque difference, ΔTM* (the absolute value |TM*| is also reduced). As a result, as shown in FIG. 25, the drive motor torque TM (powering torque) is gradually reduced from timing t11 to timing t12 (the absolute value |TM*| is also reduced).

In this case, according to this, the vehicle output torque TO* is reduced, as shown by the broken lines. If an engine torque TE smaller than the vehicle requirement torque TO* is transmitted to the drive wheel 37, then an unpleasant sensation is imparted to the driver.

Therefore, as the drive motor target torque TM* is limited so that the sum of the limited drive motor target torque TM* and the engine target torque TE* satisfies the vehicle requirement torque TO*, the engine torque adjustment processing mechanism 93 adjusts the engine target torque TE* from the timing t11 to the timing t12, increasing it by only the amount of the engine torque equivalent ΔTE* of the target torque difference ΔTM*. Accordingly, the engine torque TE during powering is gradually increased from the timing t1 to the timing t2.

As a result, the vehicle output torque TO obtained by adding the drive motor torque TM and the engine torque TE assumes a constant value without being varied from the timing t11 to the timing t12. Note that the broken lines indicate the vehicle output torque TO when the engine target torque TE* has not been adjusted when the powering torque is limited.

Note that the temperature tmM of the coil 42 indicates the torque limit index for limiting the powering torque when the powering torque is generated by the drive motor 25. Furthermore, the drive motor drive portion is constituted by the drive motor 25.

Next, the flowchart of FIG. 23 will be described. In step S17-1, a determination is made as to whether the drive motor target torque TM* is limited. If the drive motor target torque TM* is limited, the operation proceeds to step S17-2. If not limited, the operation proceeds to step S17-5. In step S17-2, the target torque difference ΔTM* is calculated, in step S17-3, the engine torque equivalent ΔTE* is calculated in step S17-4, the engine target torque TE* is adjusted and in step S17-5, the engine 11 is driven with the engine target torque TE* and the operation returns.

Meanwhile, in the hybrid vehicle described above, when a driver selects a reverse range by manipulating a shift lever in order to move the hybrid vehicle backward, the drive motor 25 is driven in a reverse direction, so that the drive motor torque TM and the drive motor rotational speed NM assume negative values and the ring gear R is rotated in the reverse direction.

Subsequently, the vehicle control device 51 reads a shift position SP detected by the shift position sensor 53 and determines whether the reverse range is selected based upon the shift position SP. If the reverse range is selected, the vehicle control device 51 calculates the drive motor target torque TM* which is a negative value, and transmits it to the drive motor control device 49. Upon receiving the drive motor target torque TM*, the drive motor control device 49 reversely drives the drive motor 25 based upon the drive motor target torque TM*, thereby rotating the drive wheel 37 in the reverse direction. Thus, the hybrid vehicle can be driven backward.

As described above, if it becomes necessary to limit the drive motor torque TM for some reason when a driver starts to move the hybrid vehicle backward while running the engine 11, it is difficult to drive the hybrid vehicle backward unless the drive motor torque TM in the reverse direction is generated such that it is sufficient to overpower the engine TE. This imparts an unpleasant sensation to the driver.

To overcome such a problem, a hybrid vehicle drive control device according to a second embodiment of the invention, which will hereafter be described, has been developed in order to reliably drive the hybrid vehicle backward by adjusting engine torque TE if it becomes necessary to limit drive motor torque TM when the hybrid vehicle is started to move backward. The structures and the like of this embodiment that are substantially the same as those of the first embodiment are represented by like reference numerals in the drawings, and will not be explained again.

In this case, the index determination processing mechanism 91 (FIG. 1) of the vehicle control device 51 (FIG. 6) executes an index determination process, reads the temperature tmM of the coil 42 detected by the drive motor temperature sensor 65 and determines whether the temperature tmM has exceeded a threshold value tmMth, i.e., whether the temperature tmM has become higher than the threshold value tmMth. If the temperature tmM has become higher than the threshold value tmMth, the torque limit processing mechanism 92 of the vehicle control device 51 executes a torque control process to limit the drive motor torque TM. Therefore, the torque limit processing mechanism 92 limits and reduces the drive motor torque TM* during backward movement.

In this case, the temperature tmM indicates the torque limit index that is the index for limiting drive motor torque TM when the drive motor torque TM is limited by the drive motor 25. Furthermore, a drive motor drive portion comprises the drive motor 25. As shown in FIG. 22, when the temperature tmM is equal to or lower than the threshold value tmMth, the limit ratio ρ is 1 and the drive motor target torque TM* during regeneration is not limited. On the other hand, when the temperature tmM becomes higher than the threshold value tmMth, the limit ratio ρ decreases as the temperature tmM increases, and thus the drive motor target torque TM* is limited and becomes ρ·TM*.

Furthermore, as in the case in which limiting of the generative torque is required, in addition to the case where the drive motor 25 has overheated and a temperature of the drive motor 25, for example, the temperature tmM of the coil 42, has become higher than the threshold value tmMth, a case such as where a temperature of the inverter 29, a temperature of the cooling oil for cooling the drive motor 25, or the like, has become higher than a threshold value or a case in which an abnormal state has occurred in the hybrid vehicle drive device may also be considered as a state that requires limiting of the drive motor torque TM. In this case, a temperature sensor such as an inverter temperature sensor for detecting a temperature of the inverter 29 or a cooling oil temperature sensor for detecting a temperature of the cooling oil that cools the drive motor 25 is provided as the torque limit index detection portion in place of the drive motor temperature sensor 65. When the temperature of the inverter 29, the temperature of the cooling oil for cooling the drive motor 25, or the like, has become higher than the respective threshold value or an abnormal state has occurred in the hybrid vehicle drive device, the sending of the drive signal SG2 to the inverter 29 is stopped. The drive of the inverter 29 is therefore stopped, thus limiting the regenerative torque in the drive motor 25.

In this case, the drive motor drive portion comprises the drive motor 25, the inverter 29 and a cooling system of the drive motor 25, and the drive motor drive portion temperature that indicates the torque limit index comprises the temperature of the drive motor 25, the temperature of the inverter 29, the temperature of the cooling oil and the like.

Furthermore, a state where a voltage, a current, an electrical output or the like, generated on the input port side of the inverter 29 in accordance with regeneration is decreased equal to or lower than a threshold may also be considered as the state that requires limiting of the regenerative torque. In this case, the torque limit index detection portion comprises a voltage sensor, a current sensor, or the like for detecting a voltage, current, or the like, generated on the input side of the inverter 29 constitutes. When the voltage, the current, or the like on the input side of the inverter 29 has become higher than the respective threshold value, the torque limit index detection portion stops the sending of the drive signal SG2 to the inverter 29, the drive of the inverter 29, and thus limits the regenerative torque in the drive motor 25. Furthermore, an electrical output calculation processing mechanism (not shown) of the drive motor control device 49 may also execute an electrical output calculation process to calculate an electrical output based on the voltage and the current, so that when the calculated electrical output has exceeded a threshold value, the sending of the drive signal SG2 to the inverter 29 is stopped. The drive of the inverter 29 is therefore stopped, thus limiting the drive motor torque TM in the drive motor 25.

In this case, the drive motor drive portion comprises the inverter 29, and the electrical variable that indicates the torque limit index comprises the voltage, the current, and the electrical output. Furthermore, the torque limit index detection portion comprises the voltage sensor, the current sensor, and the electrical output calculation mechanism.

Meanwhile, in the hybrid vehicle as described above, when the battery remaining charge SOC becomes less, the battery charge/discharge requirement output PB becomes greater. The vehicle requirement output PO also becomes greater and a driving point for the engine 11 which corresponds to the vehicle requirement output PO is determined. Consequently, the engine 11 is driven at the driving point and power is generated by the generator 16. In addition, even if a load applied on the battery 43 becomes greater due to the running of an auxiliary device, such as an air-conditioner, which consumes much power, the engine 11 is driven and power is generated by the generator 16.

As mentioned above, if it becomes necessary to limit the drive motor torque TM for some reason when a driver starts to move the hybrid vehicle backward while running the engine 11, it is difficult to drive the hybrid vehicle backward unless the drive motor torque TM in the reverse direction is generated such that it is sufficient to overpower the engine torque TE. This imparts an uncomfortable sensation to the driver.

In order to prevent such a problem, the engine control processing mechanism limits the engine torque TE by only an amount that the drive motor torque TM is limited. Specifically, it limits the engine torque TE so that the sum of the limited drive motor torque TM and the engine torque TE satisfies the vehicle requirement torque TO*, therefore limiting the engine target torque TE*.

Figure 26:
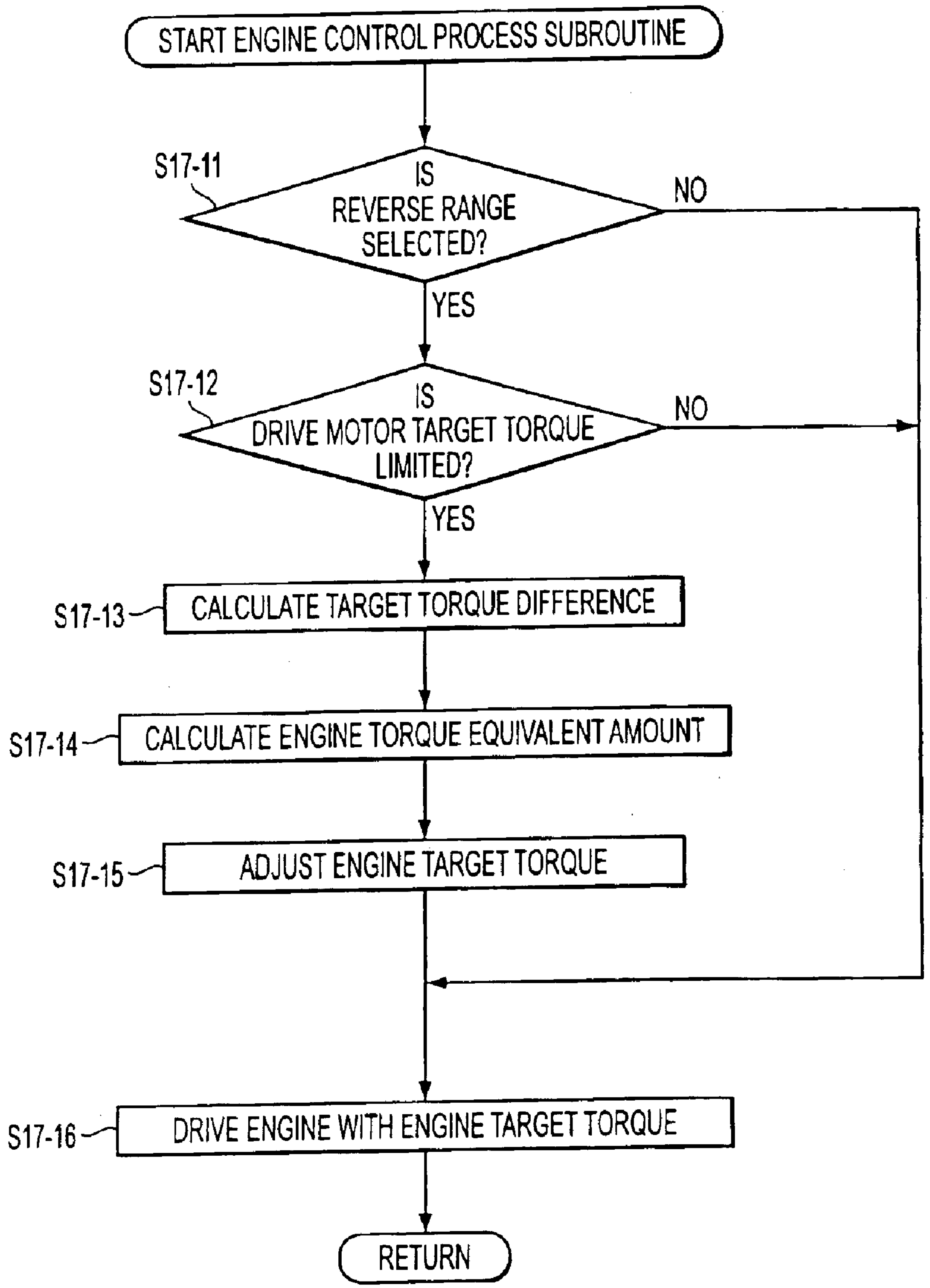
FIG. 26 is a drawing illustrating a subroutine of an engine control process according to a second embodiment of the invention.
Figure 27:
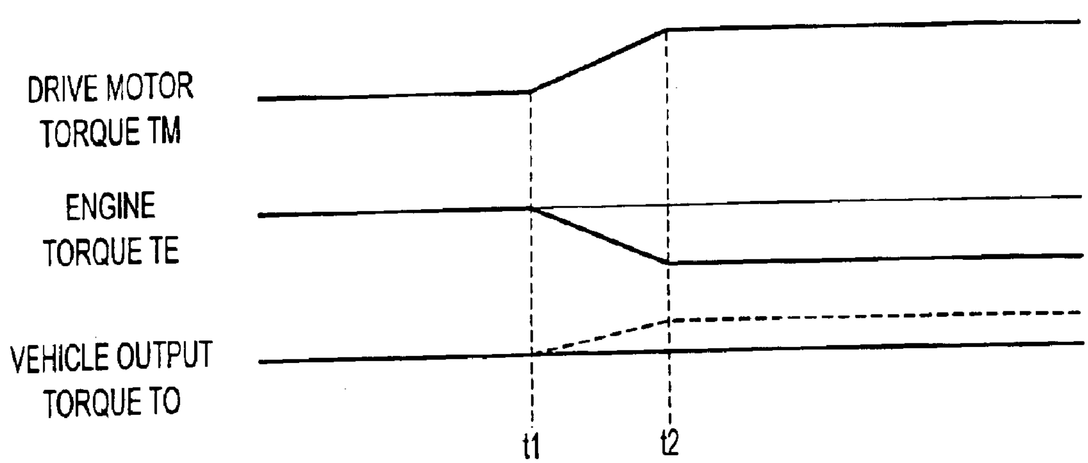
FIG. 27 is a time chart illustrating the operation of the engine control process according to the second embodiment of the invention.

Next, a subroutine of the engine control process in step S17 of FIG.8 will be described. FIG. 26 is a drawing illustrating the subroutine of the engine control process according to the second embodiment of the invention and FIG. 27 is a time chart illustrating an operation of the engine control process according to the second embodiment of the invention.

First, a range determination processing mechanism (not shown) of the engine control processing mechanism executes a range determination process in order to read the shift position SP and determine whether a reverse range is selected based upon the shift position SP. If the reverse range is selected, the torque limit determination processing mechanism (not shown) of the engine control processing mechanism performs a torque limit determination process in order to determine whether the drive motor torque TM is limited according to whether drive motor target torque TM* is limited. If the drive motor target torque TM* is limited and the drive motor torque TM is limited, the engine torque adjustment processing mechanism 93 (FIG. 1) of the engine control processing mechanism executes, as in the case of the first embodiment, an engine torque adjustment process and adjusts the engine torque TE. To accomplish this, the engine torque adjustment processing mechanism 93 calculates the difference between the drive motor target torque TM* before limiting and the drive motor target torque ρ·TM* after limiting, i.e., the target torque difference ΔTM*:

$$\Delta TM^* = TM^* - \rho \cdot TM^*$$

Next, the engine torque adjustment processing mechanism 93 calculates the engine torque equivalent ΔTE* of the target torque difference ΔTM* in order to adjust the engine target torque TE* by only the amount of the target torque difference ΔTM*. Subsequently, the engine torque adjustment processing mechanism 93 adjusts the engine target torque TE* by only an amount of the engine torque equivalent ΔTE*. If the engine target torque after adjustment is represented as TEη*, then the engine target torque TEηcan be calculated as follows:

$$TE\acute{\eta}^* = TE^* + \Delta TE^*$$

In this case, the drive motor target torque TM* and ρ·TM* are values during powering for driving the hybrid vehicle backward, and assume negative values. Furthermore, because TM*<ρ·TM*, the target torque difference ΔTM* also assumes a negative value and the engine torque equivalent ΔTE* also assumes a negative value. In this way, if the engine target torque TE* is adjusted, the engine control processing mechanism sets the limited engine target torque TEη* as the engine target torque TE* and drives the engine 11 (FIG. 6).

Therefore, for example, during powering of the drive motor 25, if the temperature tmM in timing t21 becomes higher than the threshold value tmMth, then the drive motor torque TM is limited from the timing t21 to timing t22, and the drive motor target torque TM* is limited and increased (the absolute value |TM*| is reduced) by only the amount of the target torque difference ΔTM*. Therefore, as shown in FIG. 27, the drive motor torque TM (powering torque) during powering for driving the hybrid vehicle backward is gradually increased (the absolute value |TM*| is reduced) from the timing t21 to the timing t22.

Then, as the drive motor target torque TM* is limited, the engine target torque TE* is limited and reduced by only the amount of the engine torque equivalent ΔTE*. Therefore, as shown in FIG. 27, the engine torque TE during regeneration is gradually reduced from the timing t21 to the timing t22.

As a result, a vehicle output torque TO, obtained by adding together the drive motor torque TM and the engine torque TE, assumes a constant value without being varied from the timing t21 to the timing t22.

In this way, when a torque limit index has exceeded a threshold value and it has become necessary to limit the drive motor torque TM of the drive motor 25, the engine torque TE is limited and reduced by only that amount. Therefore, the drive motor torque TM in the reverse direction is generated such that it is sufficient to overpower the engine torque TE, and this makes it easy to drive the hybrid vehicle backward. Accordingly, a driver does not have an unpleasant sensation.

Note that the broken lines in FIG. 27 indicate the vehicle output torque TO when the engine target torque TE* has not been adjusted when the drive motor torque TM is limited Next, the flowchart of FIG. 26 will be described. In step S17-11, a determination is made as to whether the reverse range is selected. If the reverse range is selected, the operation proceeds to step S17-12. If the reverse range is not selected, the operation proceeds to step S17-16. In step S17-12, a determination is made as to whether the drive motor target torque TM* is limited. If the drive motor target torque TM* is limited, the operation proceeds to step S17-13. If not, the operation proceeds to step S17-16. In step S17-13, the target torque difference ΔTM* is calculated, in step S17-14, the engine torque equivalent ΔTE* is calculated, in step S17-15, the engine target torque TE* is adjusted, and in step S17-16, the engine 11 is driven with the engine target torque TE*, and the operation returns.

A hybrid vehicle drive control device according to a third embodiment of the invention will hereafter be described. The hybrid vehicle drive control device of the third embodiment reliably moves the vehicle backward where, a reverse range is selected in a situation where the drive motor 25 cannot output the drive motor torque TM sufficient to overpower the engine torque TE even though the engine torque TE is limited due to, for example, abnormal overheating of the drive motor 25 or an insufficient amount of charges in the battery 43 caused to malfunction.

Figure 28:
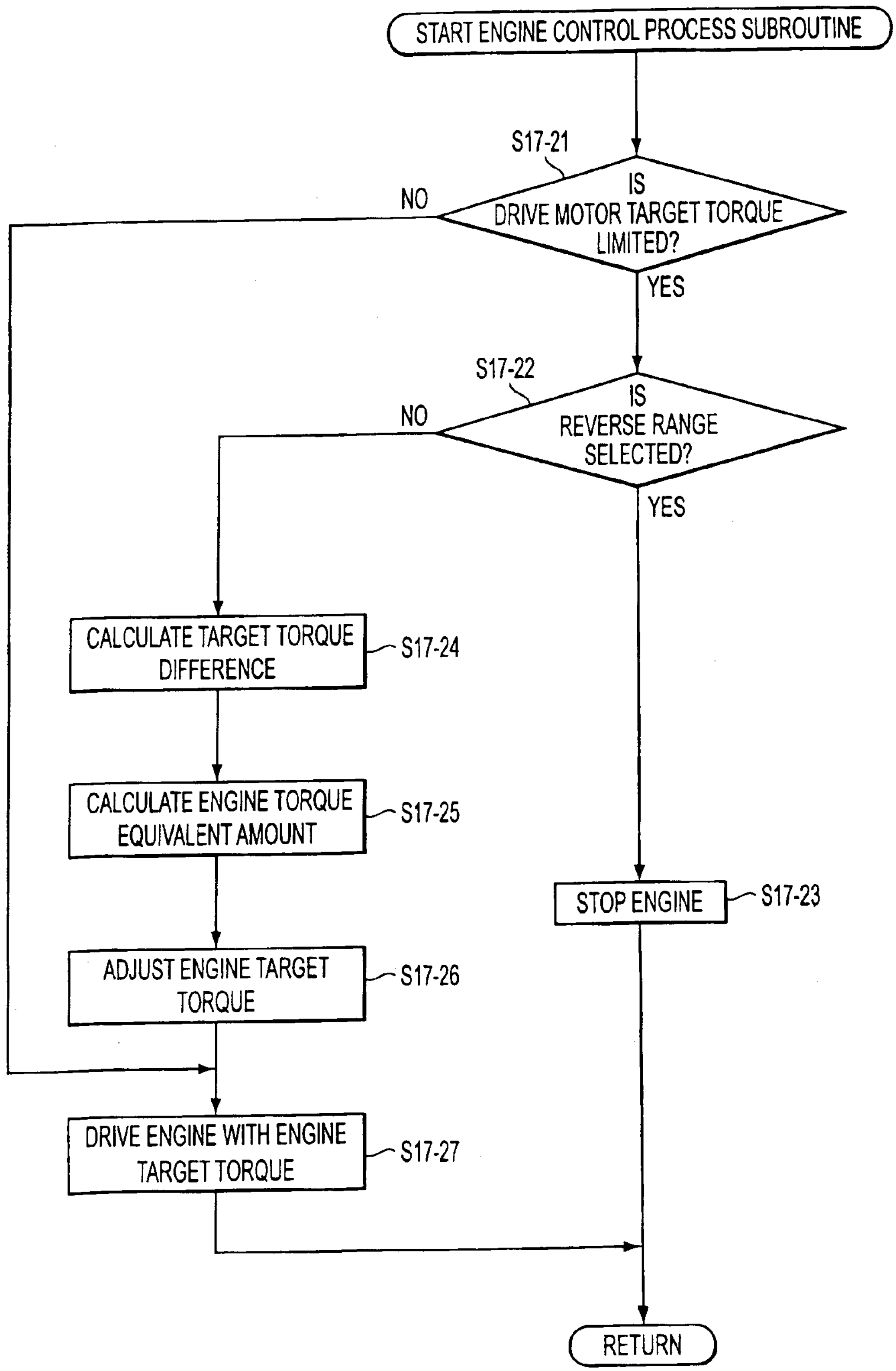
FIG. 28 is a drawing illustrating a subroutine of an engine control process according to a third embodiment of the invention.

FIG. 28 is a drawing illustrating the subroutine of the engine control process according to the third embodiment of the invention. In this case, the torque limit determination processing mechanism (not shown) of the engine control processing mechanism performs the torque limit determination process in order to determine whether the drive motor torque TM is limited according to whether the drive motor target torque TM* is limited. If the drive motor target torque TM* is limited and the drive motor torque TM is limited, the range determination processing mechanism (not shown) of the engine control processing mechanism executes the range determination process in order to read the shift position SP and determines whether the reverse range is selected based upon the shift position SP. If the reverse range is selected, the engine stop control processing mechanism (not shown) of the engine control processing mechanism executes the engine stop control process in order to stop fuel injection and ignition in the engine 11 (FIG. 6) and turn the throttle opening θ to 0 [%], thereby stopping the engine 11.

If the reverse range is not selected, the engine torque adjustment processing mechanism 93 (FIG. 1) of the engine control processing mechanism performs the engine torque adjustment process. In this way, if the reverse range is selected when the torque limit index has exceeded the threshold and it has become necessary to limit the drive motor torque TM of the drive motor 25, the engine 11 is stopped and the engine torque TE becomes zero. Accordingly, the drive motor torque TM in the reverse direction can be reliably generated.

Accordingly, this facilitates backward moving of the hybrid vehicle and prevents an unpleasant sensation from being imparted to a driver. In the present embodiment, when the reverse range is selected, the engine stop control processing mechanism executes the engine stop control process in order that the fuel injection and ignition of the engine 11 are stopped and the throttle opening θ is turned to 0 [%], thereby stopping the engine 11. However, the engine control processing mechanism may bring the engine 11 into an idling state. In this case, the engine control processing mechanism brings about the idling state by setting the engine target torque TE* to zero.

Next, the flowchart of FIG. 28 will be described. In step S17-21, a determination is made as to whether the drive motor target torque TM* is limited. If the drive motor target torque TM* is limited, the operation proceeds to step S17-22. If not limited, the operation proceeds to step S17-22. In step 17-22, a determination is made as to whether the reverse range is selected. If the reverse range is selected, the operation proceeds to step S17-23 where the engine is stopped and the operation returns. If not selected, the operation proceeds to step S17-24.

In step S17-24, the target torque difference ΔTM* is calculated, in step S17-25, the engine torque equivalent ΔTE* is calculated, in step S17-26, the engine target torque TE* is adjusted, and in step S17-27, the engine 11 is driven with the engine target torque TE*, and the operation returns.

In the third embodiment, the case where, when the reverse range is selected for example, the engine 11 is stopped or brought into an idling state has been discussed. However, this embodiment may bring the engine 11 into a stopped state or an idling state while selecting a forward range.

the invention is not limited to the aforementioned embodiments, and various modifications based on the purpose of the invention are possible, which are regarded as within the scope of the invention.

What is claimed is:

1. A hybrid vehicle control device, comprising:

a drive motor that compensates for an excessive or a deficient amount of engine torque with respect to a vehicle requirement torque; and a controller that:

detects a torque limit index, which is an index that limits a drive motor torque;

determines whether the torque limit index has exceeded a threshold value;

limits the drive motor torque when the torque limit index has exceeded the threshold value; and adjusts the engine torque, in accordance with a limiting of the drive motor torque, wherein the torque limit index is a temperature of a drive motor drive portion.

2. The hybrid vehicle control device according to claim 1, wherein the controller limits a regenerative torque during regeneration of the drive motor, the regeneration of the motor for absorbing an excessive amount of the engine torque with respect to the vehicle requirement torque.

3. The hybrid vehicle control device according to claim 1, wherein the controller limits a powering torque during powering of the drive motor, the powering of the drive motor being for compensating for the deficient amount of the engine torque with respect to the vehicle requirement torque.

4. The hybrid vehicle control device according to claim 1, wherein the controller limits the drive motor torque that is required to move the hybrid vehicle backward when a reverse range is selected.

5. The hybrid vehicle control device according to claim 4, wherein the controller stops the engine when the reverse range is selected.

6. A hybrid vehicle control device, comprising:

a drive motor that compensates for an excessive or a deficient amount of engine torque with respect to a vehicle requirement torque; and a controller that:

detects a torque limit index, which is an index that limits a drive motor torque;

determines whether the torque limit index has exceeded a threshold value;

limits the drive motor torque when the torque limit index has exceeded the threshold value; and adjusts the engine torque, in accordance with a limiting of the drive motor torque, wherein the torque limit index is an electrical variable of a motor drive portion.

7. The hybrid vehicle control device according to claim 6, wherein the controller limits a regenerative torque during regeneration of the drive motor, the regeneration of the drive motor being for absorbing the excessive amount of the engine torque with respect to the vehicle requirement torque.

8. The hybrid vehicle control device according to claim 6, wherein the controller limits a powering torque during powering of the drive motor, the powering of the drive motor being for compensating for the deficient amount of the engine torque with respect to the vehicle requirement torque by the motor.

9. The hybrid vehicle control device according to claim 6, wherein the controller limits the drive motor torque that is required to move the hybrid vehicle backward when a reverse range is selected.

10. The hybrid vehicle control device according to claim 9, wherein the controller stops the engine when the reverse range is selected.

11. A hybrid vehicle control device, comprising:

a drive motor that compensates for an excessive or a deficient amount of engine torque with respect to a vehicle requirement torque; and a controller that:

detects a torque limit index, which is an index that limits a drive motor torque;

determines whether the torque limit index has exceeded a threshold value;

limits the drive motor torque when the torque limit index has exceeded the threshold value; and adjusts the engine torque, in accordance with a limiting of the drive motor torque, wherein the controller limits the drive motor torque that is required to move the hybrid vehicle backward when a reverse range is selected.

12. The hybrid vehicle control device according to claim 11, wherein the controller stops the engine when the reverse range is selected.

13. A hybrid vehicle control device, comprising:

a drive motor that compensates for an excessive or a deficient amount of engine torque with respect to a vehicle requirement torque; and a controller that:

detects a torque limit index, which is an index that limits a drive motor torque;

determines whether the torque limit index has exceeded a threshold value;

limits the drive motor torque when the torque limit index has exceeded the threshold value; and adjusts the engine torque, in accordance with a limiting of the drive motor torque, wherein the hybrid vehicle includes:

an engine;

the drive motor;

a generator;

an output shaft connected to a drive wheel; and a differential gear unit having three gear elements, each gear element being connected to the engine, the generator, and the output shaft, and the drive motor being connected to the output shaft.

14. The hybrid vehicle control device according to claim 13, wherein the controller limits a regenerative torque during regeneration of the drive motor, the regeneration of the drive motor for absorbing the excessive amount of the engine torque with respect to the vehicle requirement torque.

15. The hybrid vehicle control device according to claim 13, wherein the controller limits a powering torque during powering of the drive motor, the powering of the drive motor being for compensating for the deficient amount of the engine torque with respect to the vehicle requirement torque.

16. The hybrid vehicle control device according to claim 13, wherein the controller adjusts the engine torque equivalent to the limited drive motor torque amount.

17. A hybrid vehicle control method, comprising detecting a torque limit index, which is an index that limits a drive motor torque of a drive motor that compensates for an excessive or a deficient amount of engine torque with respect to a vehicle requirement torque vehicle;

determining whether the torque limit index has exceeded a threshold value;

limiting the drive motor torque when the torque limit index has exceeded the threshold value; and adjusting the engine torque in accordance with the limiting of the drive motor torque, wherein the hybrid vehicle includes:

an engine;

the drive motor;

a generator;

an output shaft connected to a drive wheel; and a differential gear unit having three gear elements, each gear element being connected to the engine, the generator, and the output shaft, and the drive motor being connected to the output shaft.

18. A computer readable memory medium for a hybrid vehicle drive control apparatus, the memory medium storing a program comprising:

instructions to determine whether a torque limit index has exceeded a threshold value, instructions to limit a drive motor torque when the torque limit index has exceeded the threshold value; and instructions to adjust an engine torque in accordance with the limiting of the drive motor torque, wherein the hybrid vehicle includes:

an engine;

a drive motor;

a generator;

an output shaft connected to a drive wheel; and a differential gear unit having three gear elements, each gear element being connected to the engine, the generator, and the output shaft, and the drive motor being connected to the output shaft.

19. A hybrid vehicle control device, comprising:

a drive motor that compensates for an excessive or a deficient amount of engine torque with respect to a vehicle requirement torque; and a controller that:

determines whether a torque limit index has exceeded a threshold value, limits a drive motor torque when the torque limit index has exceeded the threshold value; and adjusts an engine torque in accordance with the limiting of the drive motor torque, wherein the hybrid vehicle includes:

an engine;

the drive motor;

a generator;

an output shaft connected to a drive wheel; and a differential gear unit having three gear elements, each gear element being connected to the engine, the generator, and the output shaft, and the drive motor being connected to the output shaft.

* * * * *